United States Patent [19]
Hibata et al.

[11] Patent Number: 5,820,059
[45] Date of Patent: Oct. 13, 1998

[54] RETRACTOR FOR SEAT BELT

[75] Inventors: Ganta Hibata; Masuo Matsuki, both of Kanagawa, Japan

[73] Assignee: NSK Ltd., Tokyo, Japan

[21] Appl. No.: 817,570

[22] PCT Filed: Oct. 2, 1996

[86] PCT No.: PCT/JP96/02867

§ 371 Date: Apr. 23, 1997

§ 102(e) Date: Apr. 23, 1997

[87] PCT Pub. No.: WO97/12785

PCT Pub. Date: Apr. 10, 1997

[30] Foreign Application Priority Data

Oct. 2, 1995 [JP] Japan ..................................... 7-276172

[51] Int. Cl.[6] .................................................. B60R 22/36
[52] U.S. Cl. ...................................................... 242/382.4
[58] Field of Search ........................ 242/382.4; 280/806, 280/807

[56] References Cited

U.S. PATENT DOCUMENTS

| | | |
|---|---|---|
| 4,566,649 | 1/1986 | Peterson, III . |
| 4,749,143 | 6/1988 | Tsukamoto et al. ................. 242/382.4 |
| 5,257,754 | 11/1993 | Hishon . |
| 5,328,120 | 7/1994 | Schmid ............................... 242/382.4 |
| 5,367,917 | 11/1994 | Hishon et al. ........................... 74/531 |
| 5,520,349 | 5/1996 | Kapanka et al. ..................... 242/382.4 |

FOREIGN PATENT DOCUMENTS

| | | |
|---|---|---|
| 59-79152 | 5/1984 | Japan . |
| 2-2264 | 1/1990 | Japan . |
| 3-124973 | 12/1991 | Japan . |
| 5-72612 | 10/1993 | Japan . |

*Primary Examiner*—John P. Darling
*Attorney, Agent, or Firm*—Sughrue, Mion, Zinn, Macpeak & Seas, PLLC

[57] ABSTRACT

A retractor for seat belt which can be surely changed over from an emergency locking retractor to an automatic locking retractor. The control mechanism for setting the engaging portion (56) in accordance with an amount of winding of the webbing (50) at the first position where the engaging portion (56) is engaged with the tooth (18a) of the ratchet wheel (18) and the second position where the engaging portion (56) is not engaged with the ratchet wheel (18), comprises a control plate (65) rotated in accordance with the rotation of the bobbin (3) and a locking lever (55) to push the engaging portion (56) to the first position or the second one by the elastic protrusion (46a). The control plate (65) and the locking lever (55) include an engaging protrusion (66) and a flexible engaging portion (60) to displace the locking lever (55) to the first position only when the webbing (50) is wound after the webbing has been drawn out by an amount not less than a predetermined value.

9 Claims, 20 Drawing Sheets

RETRACTOR FOR SEAT BELT

TECHNICAL FIELD

The present invention relates to a retractor (winding device) used for a seat belt device. More particularly, the present invention relates to improvements in a retractor for seat belt having both an emergency locking mechanism and an automatic locking mechanism.

BACKGROUND ART

Concerning a seat belt for holding a passenger in a seat of a vehicle safely, there is conventionally provided a seat belt device having a retractor in which an emergency locking mechanism is operated to restrict a body of a passenger in the case of emergency and an automatic locking mechanism can be operated to fix a piece of baggage or a child seat to a seat of a vehicle.

Namely, the above retractor for seat belt comprises: an emergency locking mechanism having a locking means engaged with a winding shaft so that the winding shaft can not be rotated in a direction of drawing the webbing and also having an inertia detecting means for operating the locking means in the case of emergency of a vehicle; and a controlling means for controlling the operation of the emergency locking mechanism in accordance with the webbing winding condition so that the locking means can be appropriately set at an engaging position or a non-engaging position with respect to the winding shaft. When the controlling means controls the locking means so that it can be engaged with the winding shaft, the winding shaft is locked and prevented from rotating in the direction of drawing the webbing. In this way, the automatic locking mechanism is operated.

Japanese Unexamined Utility Model Publication No. 5-72612 discloses a retractor for seat belt having the above controlling means, so that the emergency locking retractor can be surely changed over to the automatic locking retractor.

FIG. 27 is a front view showing the operation of the locking mechanism of the webbing winding device disclosed in Japanese Unexamined Utility Model Publication No. 5-72612 described above.

The webbing winding device is operated as follows. In the normal operation in which a passenger wears the seat belt, the locking wheel 242 is rotated integrally with the webbing winding shaft (not shown in the drawing) without causing a delay of rotation with respect to the webbing winding shaft. Accordingly, the webbing can be freely drawn out. When the winding shaft is given an acceleration, the value of which is higher than a predetermined value, in the webbing drawing direction in the case of emergency, rotation of the locking wheel 242 is delayed with respect to the webbing winding shaft. Accordingly, the locking means (not shown in the drawing) prevents the webbing from being drawn out. In this way, the emergency locking mechanism is operated.

The controlling means, which changes over the automatic locking mechanism between an operating condition and a non-operating condition, includes: an engaging lever 230 rotatably supported by a support shaft 294, the claw portion 234 of the engaging lever 230 being oscillated so that it can be engaged with and disengaged from a ratchet tooth 246 arranged on an outer circumference of the locking wheel 242; and a release gear 202 for oscillating this engaging lever 230 round the support shaft 294 in accordance with the webbing winding condition.

There is provided an arm 232 which is formed integrally with the engaging lever 230. At an end of the arm 232, there is provided an engaging pin 236. In the normal operation, this engaging pin 236 is inserted into an outside cam groove 240 formed in the release gear 202. In this condition, the claw 234 of the engaging lever 230 is not engaged with the ratchet tooth 246. Therefore, the automatic locking mechanism is put in a non-operating condition.

When the webbing (not shown in the drawing) is drawn out, the release gear 202 is rotated counterclockwise (in the direction of arrow A in the drawing). When an amount of the webbing that has been drawn out reaches a predetermined value, the engaging pin 236 of the engaging lever 230 is moved from the outside cam groove 240 and inserted into the narrow width groove 254. Due to the foregoing, the engaging lever 230 is rotated from the neutral position toward the locking wheel 242 and pushed by the compression spring 298 in a direction so that the claw 234 can be engaged with the ratchet tooth 246. However, since the engaging pin 236 comes into contact with the inside wall 254A of the narrow width groove 254, the claw 234 is not engaged with the ratchet tooth 246. Accordingly, even in this condition, the automatic locking mechanism is put in the non-operating condition.

When the webbing is wound in the above condition, the release gear 202 is rotated clockwise (in the direction of arrow B in the drawing). Therefore, the engaging pin 236 is drawn out from the narrow width groove 254 and inserted into the wide width groove 256. Accordingly, the engaging lever 230 is rotated clockwise round the support shaft 294 by a pushing force of the compression coil spring 298. Therefore, the claw 234 is engaged with the ratchet tooth 246 of the locking wheel 242. Due to the foregoing, rotation of the locking wheel 242 is stopped, and there is caused a slippage of rotation between the webbing winding shaft and the locking wheel 242. Therefore, the aforementioned locking means is operated, and rotation of the webbing winding shaft is stopped. For this reason, the webbing can not be drawn out any more, and the automatic locking mechanism is put in the operating condition.

When the webbing is wound by an amount not smaller than a predetermined value after that, the release gear 202 is rotated in the direction of arrow B, so that the guide wall 258A pushes the engaging pin 236. Accordingly, the engaging lever 230 is rotated counterclockwise round the support shaft 294 while it resists a pushing force of the compression spring 298. Accordingly, the engaging lever 230 is disengaged from the locking wheel 242. Due to the foregoing, the locking wheel 242 can be freely rotated, and the seat belt unit is returned from the automatic locking mechanism operating condition to the emergency locking mechanism operating condition.

As described above, the compression coil spring 298 of the retractor for seat belt disclosed in Japanese Unexamined Utility Model Publication No. 5-72612 changes a pushing direction of the engaging lever 230 by the clicking motion (oscillating motion). Specifically, in the normal operation, an upper portion of the compression spring 298 is moved in a direction so that the compression spring 298 can be separated from the locking wheel 242, and the engaging lever 230 and the arm 232 are pushed to the outward of the locking wheel 242 so that the engaging pin 236 can be maintained in a condition in which it comes into contact with the outside wall of the outside cam groove 240. When a predetermined amount of webbing has been drawn out and the engaging pin 236 is inserted into the narrow width groove 254, as illustrated in FIG. 27, the upper portion of the compression spring 298 is moved in a direction so that the compression spring 298 can approach the locking wheel 242, and the engaging lever 230 and the arm 232 are pushed to the inward of the locking wheel 242 so that the engaging pin 236 can be maintained in a condition in which the engaging pin 236 comes into contact with the inside wall of the narrow width groove 254.

In this case, the engaging lever 230 is rotatably held at a position close to the neutral position of the clicking motion of the compression spring 298. Accordingly, the following problems may be encountered. Depending upon the fluctuation of accuracy of parts and assembly, even after the engaging pin 236 has been inserted into the narrow width groove 254, the pushing direction of the compression spring 298 is not changed, and even after the engaging pin 236 has been drawn out from the narrow width groove 254 and inserted into the wide width groove 256, the engaging lever 230 stops at the neutral position.

Also, the following problems may be encountered. When the engaging lever 230 is located at the neutral position at which the engaging pin 236 is inserted into the narrow width groove 254, the claw 234 comes close to the ratchet tooth 246. Accordingly, depending upon the fluctuation of accuracy of parts and assembly, the claw 234 is meshed with the ratchet tooth 246 although the engaging lever 230 is located at the neutral position. For this reason, it becomes impossible to draw out all the amount of webbing.

An object of the present invention is to provide a retractor for seat belt capable of being surely changed over from the emergency locking retractor to the automatic locking retractor without enhancing the accuracy of parts and assembly.

CONSTRUCTION OF THE INVENTION

The object of the present invention can be accomplished by a retractor for seat belt comprising: a winding shaft round which a webbing is wound; a locking means for locking the rotation of the winding shaft in a direction of drawing the webbing; a locking operation means for locking the rotation of the winding shaft in the direction of drawing the webbing by operating the locking means in the case of emergency; an engaging member having an engaging portion capable of being changed over between a first position at which the engaging portion is engaged with the locking operation means and a second position at which the engaging portion is not engaged with the locking operation means; and a controlling means for controlling the engaging portion to be located at the first position and the second position, wherein the controlling means includes a control plate rotated together with the winding shaft and also includes a control mechanism arranged between the control plate and the engaging member, the control mechanism holds the engaging portion at the second position when the webbing is drawn out by an amount not less than a first predetermined amount, the control mechanism displaces the engaging portion from the second position to the first position when the webbing is wound by the first predetermined amount after said webbing has been thus drawn out by the amount not less than the first predetermined amount, and then the control means displaces the engaging portion from the first position to the second position when the webbing is further wound by an amount not less than a second predetermined amount.

According to a preferable embodiment, the control means includes: an engaging protrusion arranged on one of the control plate and the engaging member; and a flexible engaging portion arranged on the other of the control plate and the engaging member, wherein the flexible engaging portion is capable of being deformed so that it can get over the engaging protrusion when the webbing is drawn out by an amount not less than the first predetermined amount, and the flexible engaging portion is engaged with the engaging protrusion when the webbing is wound by the first predetermined amount.

According to a preferable embodiment, the control mechanism includes: an outer circumferential wall for forming an outside cam surface to hold the engaging portion at the second position where the engaging portion is not engaged with the locking operation means when the engaging protrusion of the engaging member is located close to the outer circumference of the control plate; an inside cam groove arranged inside the outer circumferential wall for preventing the engaging portion from being displaced from the first position where the engaging portion is engaged with the locking operation means, to the second position undesirably when the engaging protrusion is located close to the inner circumference of the control plate; an introducing portion capable of introducing the engaging protrusion into the inside cam groove when the webbing is drawn out by an amount not less than the first predetermined amount; a guide portion having a cam surface for displacing the engaging protrusion from the inside cam groove to the outside cam surface when the webbing is wound by an amount not less than the second predetermined amount after that; a flexible engaging portion of the engaging member; and an engaging protrusion to be engaged with the flexible engaging portion.

According to another preferable embodiment, the engaging member includes: a cylindrical portion idly inserted into the support shaft; an engaging portion and an oscillating piece extending radially outward from the cylindrical portion; an engaging protrusion and a flexible engaging portion protruding from an oscillating end of the oscillating piece so as to be engaged with the control plate; and a cam surface formed on the oscillating piece.

According to still another preferable embodiment, the cam surface is engaged with an elastic protrusion formed on the outside of the front end of the flexible piece integrally formed on the outer wall of the gear case, and the engaging member is pushed by an elastic pushing force acted on the cam surface by the elastic protrusion, in a direction so that the engaging portion can be located at a first position where the engaging portion is engaged with the locking operation means so as to prevent its rotation or located at a second position where the engaging portion is not engaged with the locking operation means.

According to still another preferable embodiment, the cam surface is engaged with an elastic protrusion of the return spring arranged on the outer wall of the gear case, and the engaging member is pushed by an elastic pushing force acted on the cam surface by the elastic protrusion, in a direction so that the engaging portion can be located at a first position where the engaging portion is engaged with the locking operation means so as to prevent its rotation or located at a second position where the engaging portion is not engaged with the locking operation means.

According to the above structure, by the action of the controlling mechanism arranged between the control plate and the engaging member, when the webbing is drawn out by an amount not less than the first predetermined amount which is a little smaller than all the amount of webbing to be drawn out, the engaging member is in a state of operation of the emergency locking mechanism in which the engaging portion is held at the second position so that the engaging portion is not engaged with the locking operation means. Accordingly, a sufficiently large clearance is formed between the engaging portion and the locking operation means. Accordingly, there is no possibility that all the webbing can not be drawn out when the engaging portion of the engaging member is engaged with the locking operation means depending upon the fluctuation of accuracy of parts and assembly.

When the webbing is wound a little so that an amount of webbing can reach the first predetermined amount after all the webbing has been drawn out from the retractor, the controlling mechanism directly displaces the engaging member from the second position at which the locking operation means is not operated, to the first position at which the locking operation means is operated. Accordingly, there is no possibility that the engaging member stops at the neutral position in a clicking motion by the fluctuation of accuracy of parts and assembly.

Accordingly, it is not necessary to enhance the assembling accuracy of the control plate and the engaging member, and inaccuracy can be absorbed when the retractor is assembled. Therefore, it is possible to easily provide a controlling means for surely changing over between the emergency locking mechanism operating condition and the automatic locking mechanism operating condition, and parts of the controlling means can be easily manufactured and assembling can be easily performed.

In other words, it is possible to change over from the emergency locking retractor to the automatic locking retractor without enhancing the assembling accuracy of parts composing the retractor.

BEST MODE FOR CARRYING OUT THE INVENTION

Referring to the attached drawings, an embodiment of the present invention will be explained in detail below.

Figure 1:
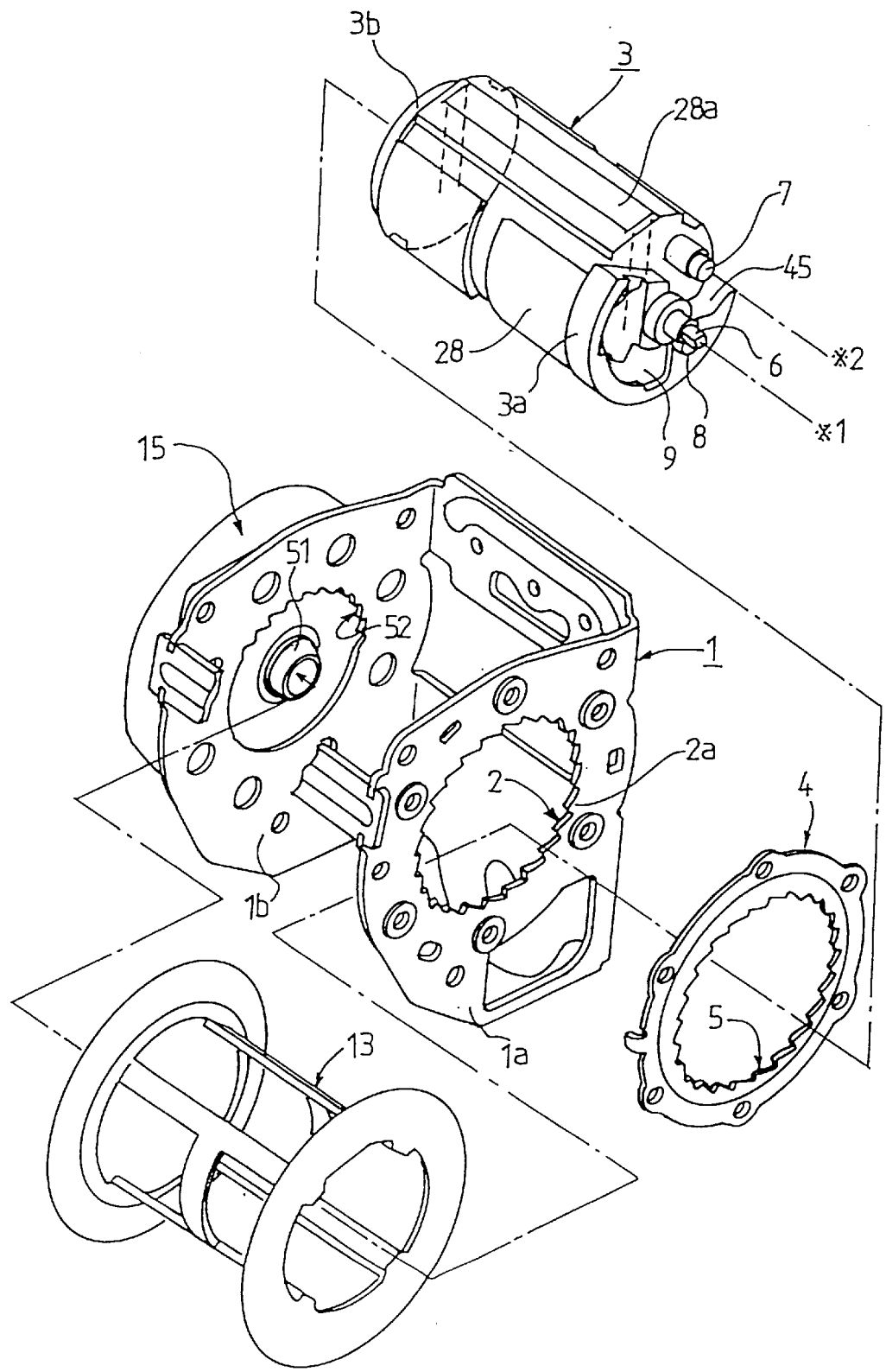
FIG. 1 is a portion of an exploded perspective view of the retractor for seat belt of the first example of the present invention.
Figure 2:
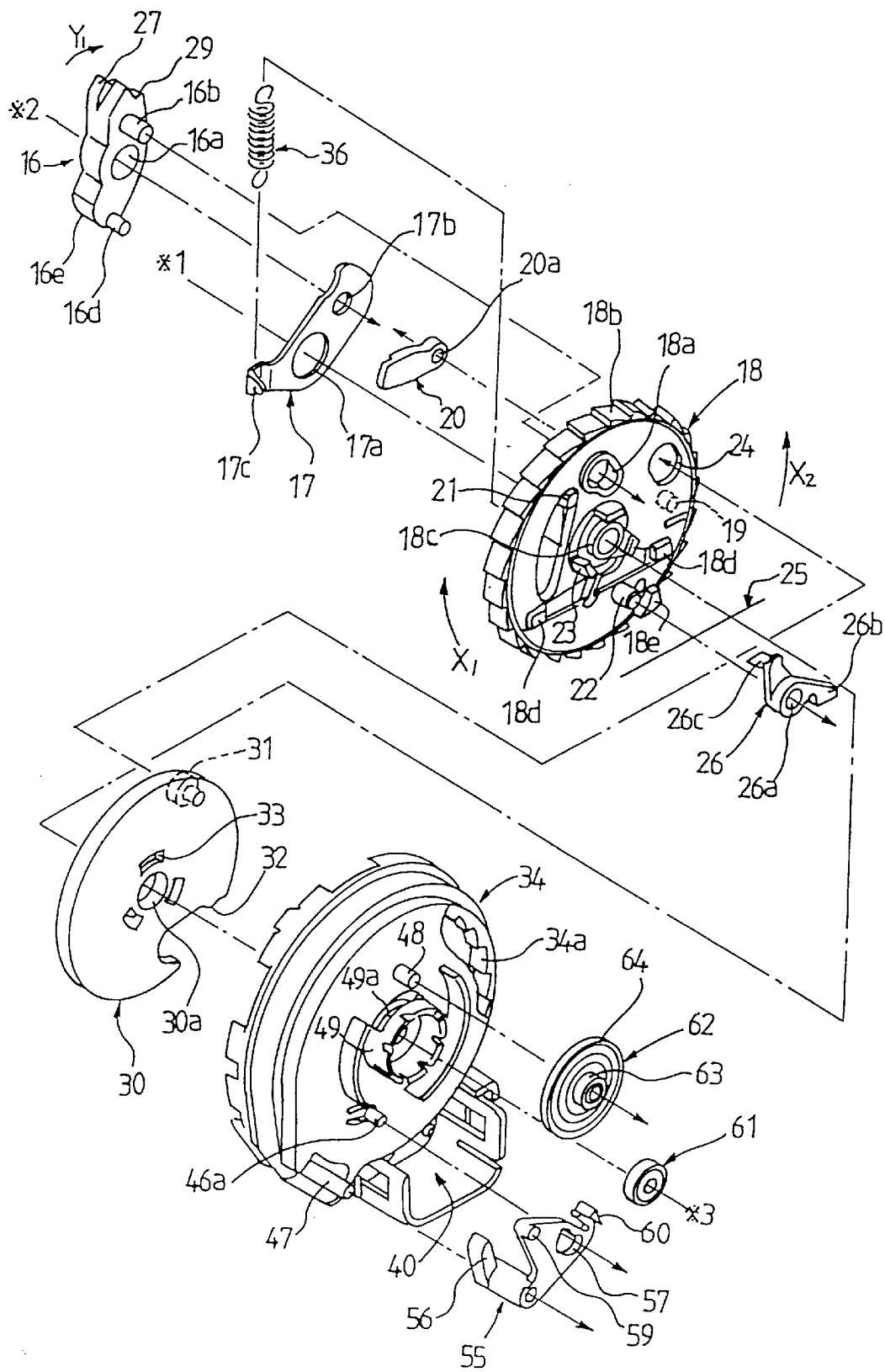
FIG. 2 is a portion of an exploded perspective view of the residual portion of the retractor for seat belt illustrated in FIG. 1.
Figure 3:
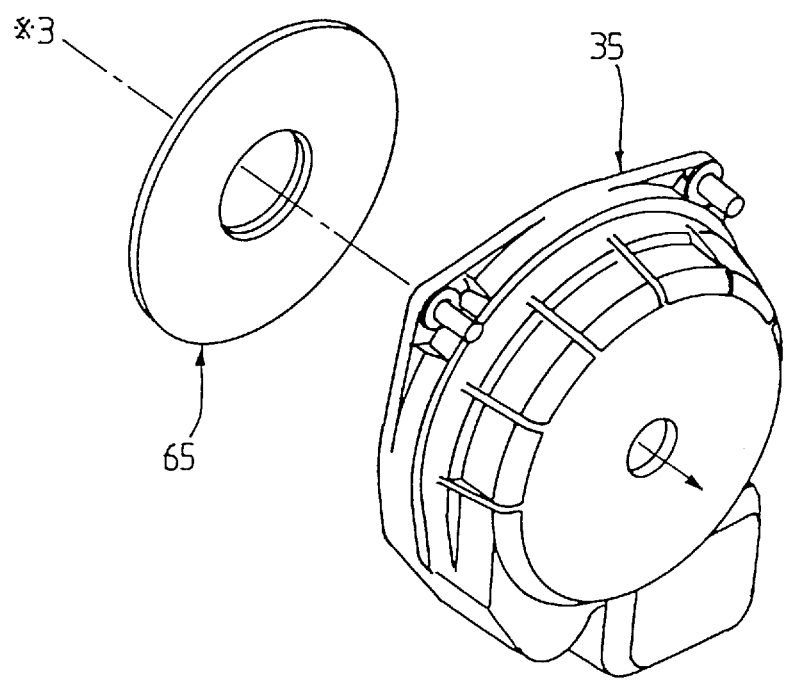
FIG. 3 is an exploded perspective view of the residual portion of the retractor for seat belt illustrated in FIGS. 1 and 2.

In FIGS. 1 to 3 which are exploded perspective views of the retractor for seat belt according to the first example of the present invention, there is provided a retractor base 1, the most portion of which is formed into a C-shaped section. There are provided side plates 1a, 1b which are opposed to each other. On the side plates 1a, 1b, there are respectively formed through-holes into which a winding shaft is inserted. There is provided a bobbin 3 which is a winding shaft round which a piece of webbing is wound. The bobbin 3 is inserted into these winding shaft through-holes, so that the bobbin 3 can be freely rotated.

At an inner circumferential edge of the winding shaft through-hole formed on the side plate 1a, engaging inner teeth 2 of the first row are arranged. Outside the winding shaft through-hole, there is provided a substantially annular inner tooth ratchet 4 which is a member to be locked. At an inner circumferential edge of the inner tooth ratchet 4, there are formed engaging inner teeth 5 of the second row, the shape and the number of teeth of which are the same as those of the engaging inner teeth 2 of the first row. However, the engaging inner teeth 5 of the second row are fixed in such a manner that they are displaced in the circumferential direction by a distance of about ½ tooth with respect to the engaging inner teeth 2 of the first row. That is, the engaging inner teeth 2 and 5 of the first row and the second one compose a portion to be locked with a locking means for preventing the rotation of the bobbin 3 in the direction of drawing out the webbing in the case of emergency of a vehicle.

Further, an outer peripheral portion of the engaging inner teeth 5 of the second row of the inner tooth ratchet 4 is subjected to the processing of drawing, in such a manner that when the inner tooth ratchet 4 is fixed onto the outside of the side plate 1a, there is formed a clearance in the axial direction between the engaging inner teeth 2 of the first row and the engaging inner teeth 5 of the second row.

At an end portion of the bobbin 3 on the side plate 1b side, there is provided a well known spring device 15 for winding. By the action of the spring device 15, the bobbin 3 is pushed at all times in a direction so that the webbing can be wound.

The bobbin 3 is a substantially cylindrical winding shaft integrally made of aluminum alloy. In a barrel portion 28 of the bobbin 3 round which the webbing is wound, there is provided a slit 28a formed in the radial direction, and an end portion of the piece of webbing is inserted into and held by the slit 28a. A flange member 13, which is formed differently from the bobbin 3, is attached to the outer circumferential portion of the bobbin 3 in such a manner that the winding of the webbing it prevented from being disordered.

On both end surfaces of the bobbin 3, there are provided rotary shafts 6, and the bobbin 3 can be rotatably supported by the rotary shafts 6. On the sensor side end surface of the bobbin 3, there is provided a support shaft 7 which rotatably supports a pawl 16 which functions as a locking member capable of engaging with the engaging inner teeth 2, 5 of the first row and the second one arranged on the side plate 1a.

On the sensor side end surface of the bobbin 3, there is provided a pressure receiving surface 45. By the pressure receiving surface 45, a rear end portion 16e of the pawl on the opposite side to the oscillating side end portion of the pawl 16 can be positioned when the pawl 16 is oscillated in a direction in which the pawl 16 can be engaged with the engaging inner teeth 2, 5 of the first row and the second one. Also, by the pressure receiving surface 45, a load given to the pawl 16 by the engaging inner teeth 2, 5 of the first row and the second one is received.

Further, on the sensor side end surface of the bobbin 3, there is provided an engaging protrusion 8 for restricting a counterclockwise rotation of the oscillating lever 20 rotatably supported by the ratchet wheel 18 which is a locking member described later. There is provided a recess 9, which is formed to accommodate a tensile coil spring 36 for rotatably pushing the ratchet wheel 18 in the webbing drawing direction, and the recess 9 is also formed to accommodate the arm portion 26c of the locking arm 26 which pushes the sensor spring 25, so that the arm portion 26c of the locking arm 26 can not interfere with the bobbin 3.

In the oscillating end portion of the pawl 16, there are integrally provided an engaging tooth 27 of the first row and an engaging tooth 29 of the second row, wherein the engaging tooth 27 of the first row can be engaged with the engaging inner teeth 2 of the first row, and the engaging tooth 29 of the second row can be engaged with the engaging inner teeth 5 of the second row. These engaging teeth 27, 28 of the first row and the second one are displaced from each other in the circumferential direction by a distance corresponding to ½ tooth.

At the center of the pawl 16, there is formed a shaft hole 16a into which the support shaft 7 is idly inserted. On the sensor side surface of the pawl 16, there are provided an engaging protrusion 16b located at the oscillating end side, and a pushing protrusion 16d located at the rear end portion 16e of the pawl. Since the shaft hole 16a is idly engaged with the support shaft 7, the pawl 16 can be oscillated round the support shaft 7, and the pawl 16 can be moved by a predetermined distance with respect to the support shaft 7. The rotary support shaft 6 of the bobbin 3 penetrates the through-hole 17a of the holding plate 17. Into the engaging hole 17b of the holding plate 17, a front end of the support shaft 7, which has penetrated the shaft hole 16a of the pawl 16, is inserted and fastened. Therefore, the pawl 16 is not separated from the end surface of the bobbin 3 by the holding plate 17.

An end portion of the engaging protrusion 16b of the pawl 16 is inserted into the cam hole 18a formed in the ratchet wheel 18 rotatably supported by the rotary support shaft 6 of the bobbin 3, wherein the ratchet wheel 18 is arranged outside the holding plate 17.

When the ratchet wheel 18 is relatively rotated in the direction of winding the webbing (the direction of arrow $X_1$ illustrated in FIG. 2) with respect to the bobbin 3, the cam hole 18a acts to move the end portion of the engaging protrusion 16b from the rotational center of the bobbin 3 to the outside in the radial direction. Accordingly, the pawl 16 is oscillated round the support shaft 7 in the engaging direction (the direction of arrow $Y_1$ illustrated in FIG. 2) with the engaging inner teeth 2, 5 of the first row and the second one composed on the side plate 1a.

When the pawl 16 is oscillated in the direction so that the pawl 16 can be engaged with the engaging inner teeth 2, 5 of the first row and the second one, the engaging teeth 27, 29 of the first row and the second one are simultaneously engaged with the engaging inner teeth 2, 5 of the first row and the second one. In this way, the locking means can be formed, by which the bobbin 3 is prevented from rotating in the direction of drawing the webbing.

The ratchet wheel 18 is rotatably supported by the rotary support shaft 6 at its central hole. On the outer circumference of the ratchet wheel 18, there are provided ratchet teeth 18b engaging with the sensor arm 43 of the vehicle acceleration detecting means 41 (shown in Fig; 8). In the periphery of the central hole of the ratchet wheel 18, there is provided a boss portion 18c which protrudes outside the retractor. The boss portion 18c supports the central hole 30a of the disk-shaped inertia plate 30 which composes a webbing acceleration detecting means for detecting the acceleration of the webbing when it is drawn out. In the periphery of the boss portion 18c, there is provided an engaging claw portion 23 which protrudes to the periphery. This engaging claw portion 23 positions the inertia plate 30 in the thrust direction. There is provided a long hole 24 in the ratchet wheel 18. This long hole 24 is engaged with the engaging protrusion 31 of the inertia plate 30. One end edge 24a (shown in FIG. 10) of the long hole 24 positions the inertia plate 30 in the rotating direction.

On the outside surface of the ratchet wheel 18, there are provided a shaft for rotatably supporting the locking arm 26, and a holding protrusion 18e for preventing the locking arm 26 from separating from the ratchet wheel 18. On the inside surface of the ratchet wheel 18, there is provided a spring hooking portion 21 for hooking one end of the tensile coil spring 36, the other end of which is hooked at the hooking portion 17c of the holding plate 17. By the action of the tensile coil spring 36, the ratchet wheel 18 is rotatably pushed with respect to the bobbin 3 in the direction (the direction of arrow $X_2$) of drawing the webbing.

In the locking arm 26, there are provided an arm portion 26c and an engaging claw 26b. In this case, the arm portion 26c pushes a center of the linear sensor spring 25 in the longitudinal direction, both the end of which are supported by a pair of hook portions 18d provided on the outside surface of the ratchet wheel 18, and the engaging claw 26b is engaged with the inner tooth gear 34a of the gear case 34.

The engaging claw 26b of the locking arm 26 is meshed with the inner tooth gear 34a, so that the rotation of the ratchet wheel 18 in the direction of drawing the webbing is prevented. In this way, the means for preventing the ratchet wheel 18 from rotating in the direction of drawing the webbing can be constituted. The engaging claw 26b is pushed to the pushing protrusion 32 of the inertia plate 30 by the pushing force of the sensor spring 25. In this connection, there is formed an opening in the ratchet wheel 18 corresponding to a range of oscillation of the arm 26c, and the arm 26c penetrates the opening. Due to the foregoing, engagement of the arm 26c with the sensor spring 25 can be ensured.

On the inside surface of the ratchet wheel 18, there is provided a support shaft 19. There is provided an oscillating lever 20, the shaft hole 20a of which is engaged with the support shaft 19 on the inside surface of the ratchet wheel 18. Therefore, the oscillating lever 20 can be oscillated round the support shaft 19. A counterclockwise rotation of the oscillating lever 20 is appropriately restricted by the engaging protrusion 8 which protrudes from the sensor side end surface of the bobbin 3. When the pushing protrusion 16d, which is provided on the sensor side surface of the pawl 16, comes into contact with a portion between the support shaft 19 and the engaging protrusion 8, a clockwise rotation of the oscillating lever 20 is appropriately restricted. In this way, the oscillating lever 20 is incorporated between the bobbin 3 and the ratchet wheel 18.

There is provided a gear case 34 outside the inertia plate 30. The rotary support shaft 6 of the bobbin 3 penetrates a central hole of the gear case 34. To the front end portion of the rotary support shaft 6, the main gear 61 is attached. On the outer wall of the gear case 34, there is provided a boss wall 49 which protrudes to the outside of the retractor in such a manner that the boss wall 49 covers the support shaft 48 and the main gear 61. An idle gear 62 is rotatably supported by the support shaft 48. This idle gear 62 is meshed with the main gear 61 of the large gear section 64 which penetrates the cutout portion 49a of the boss wall 49. The control plate 65 is rotatably supported by the boss wall 49. This control pate 65 is rotated at a reduced speed while the inner teeth 67 are meshed with the pinion gear 63 of the idle gear 62. The control plate 65 composes a control means together with a control mechanism provided between the control plate 65 and the locking lever 55 described later. The control plate 65 is made of synthetic resin, and a cam surface composing the control mechanism is appropriately formed on the inner surface of the control plate 65.

There is provided a support shaft 47 which protrudes from the gear case 34. A lock lever 55, which is an engaging member made of synthetic resin, is rotatably supported by the support shaft 47. In the lower portion of the gear case 34, there is provided a box-shaped accommodating section 40 in which a vehicle acceleration detecting means 41 is accommodated. This vehicle acceleration detecting means 41 is an inertia detecting means for detecting an acceleration given to the vehicle.

Figure 4:
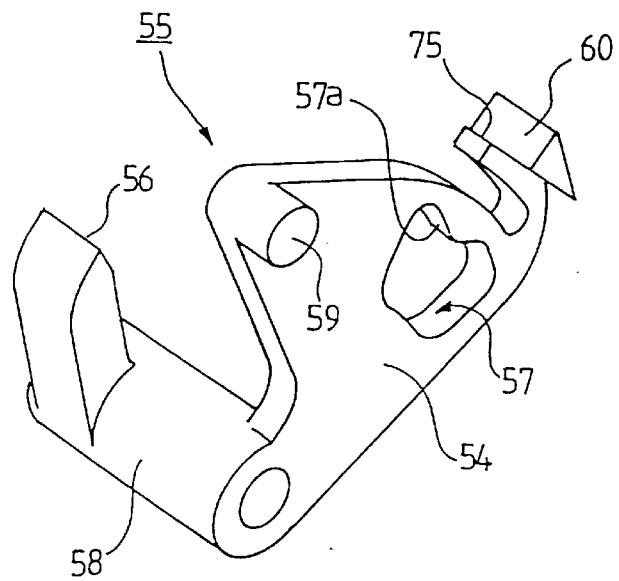
FIG. 4 is an overall enlarged perspective view of the locking lever illustrated in FIG. 2.
Figure 5:
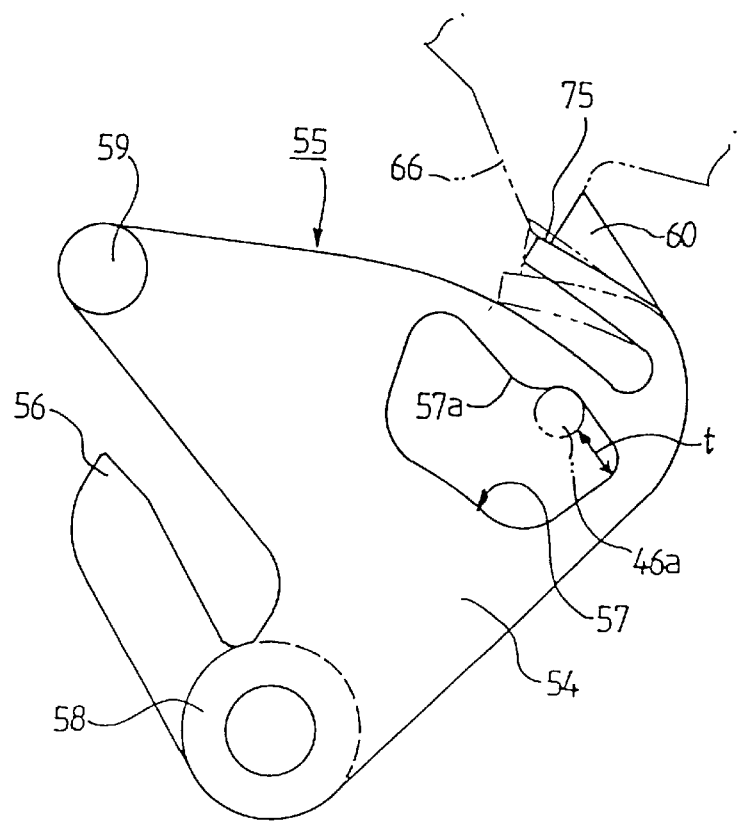
FIG. 5 is a front view of the locking lever illustrated in FIG. 4.

As illustrated in FIGS. 4 and 5, the locking lever 55 includes: a cylindrical portion 58 idly engaged with the support shaft 47; an engaging portion 56 extending radially outward from the cylindrical portion 58; an oscillating piece 54 also extending radially outward from the cylindrical portion 58; an engaging protrusion 59 which protrudes from an oscillating end portion of the oscillating piece 54 so that it can be engaged with the control plate 65; a flexible engaging section 60 which protrudes from an oscillating end portion of the oscillating piece 54; and a cam hole 57 formed in the oscillating piece 54.

A cam surface 57a of the cam hole 57 is engaged with an elastic protrusion 46a vertically provided on a front end outside surface of the flexible piece 46 formed integrally with the outer wall of the gear case 34. The locking lever 55 is pushed by an elastic pushing force acted on the cam surface 57a caused by the elastic protrusion 46a in a direction so that the engaging portion 56 can be moved to the first position or the second position. At the first position, the locking lever 55 is engaged with the tooth 18b of the ratchet wheel 18 so that the rotation of the ratchet wheel 18 can be stopped, and at the second position, the locking lever 55 is not engaged with the tooth 18b of the ratchet wheel 18. That is, when the elastic protrusion 46a gets over a top of the cam which is a neutral position of the cam surface 57a, the lock lever 55 conducts a click motion so that the engaging portion 56 can be held at the first position or the second one.

The engaging protrusion 59 is engaged with the cam surface of the control plate 65 composing the control mechanism, and the locking lever 55 is oscillated in accordance with the cam surface. The flexible engaging portion 60 is engaged with the engaging protrusion 66 of the control plate 65 composing the control mechanism together with the locking lever 55. When the webbing is drawn out, the flexible engaging portion 60 and the engaging protrusion 66 come into contact with each other in such a manner that both tapered surfaces are opposed to each other. As illustrated by an imaginary line in FIG. 5, the flexible engaging portion 60 is bent so that the flexible engaging portion 60 can get over the engaging protrusion 66, that is the flexible engaging portion 60 is separated from the engaging protrusion 66. Therefore, the engaging protrusion 66 of the control plate 65 passes through as it is. However, when the webbing is wound, their perpendicular surfaces come into contact with each other in such a manner that they are opposed to each other. Accordingly, it is impossible for the flexible engaging portion 60 to be bent, so that the flexible engaging portion 60 can not get over the engaging protrusion 66. Since the flexible engaging portion 60 is pushed by the engaging protrusion 66 of the control plate 65, the locking lever 55 is oscillated clockwise in FIG. 5.

Figure 8:
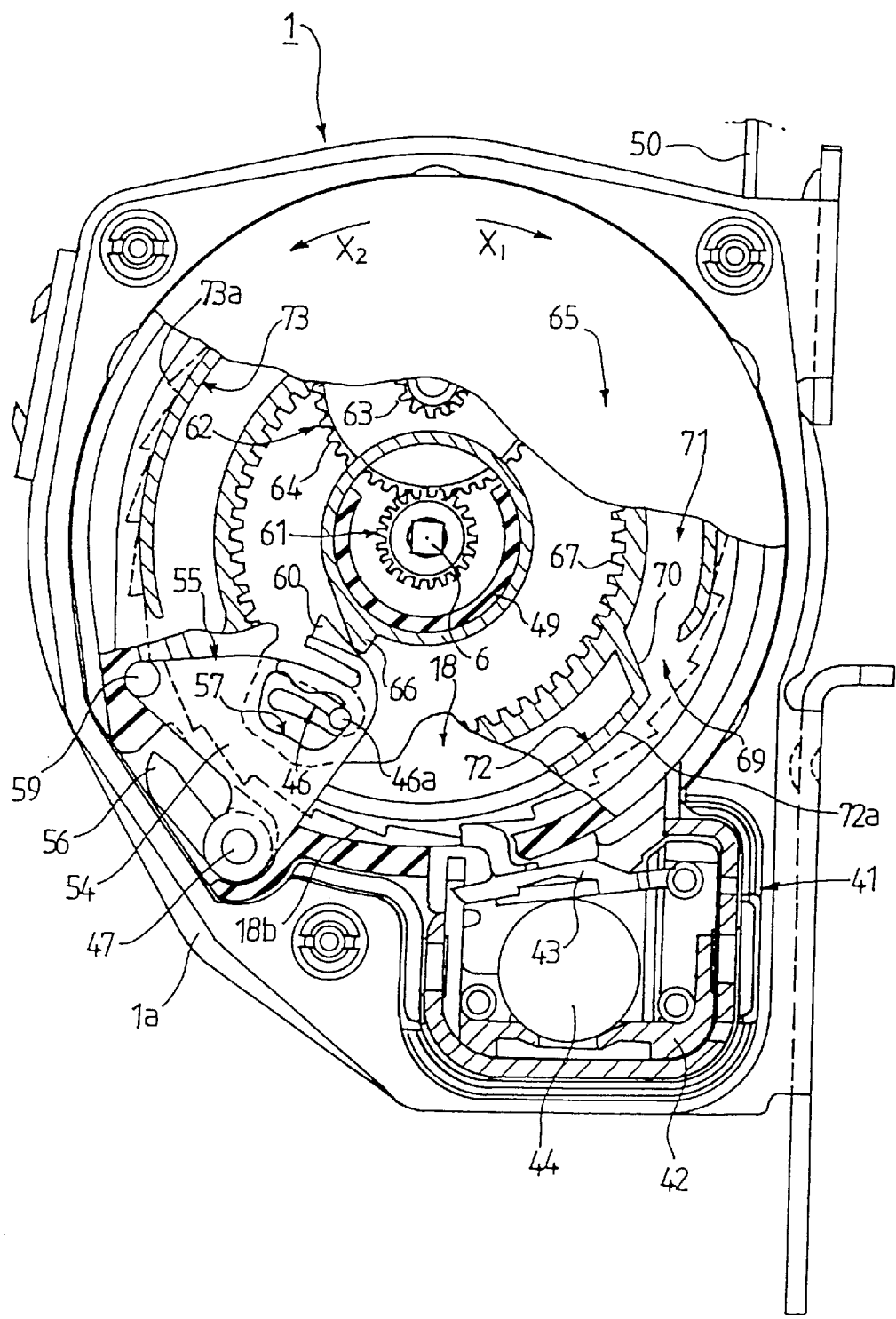
FIG. 8 is a partially cutaway side view of the retractor for seat belt illustrated in FIGS. 1 to 3.

Therefore, the engaging portion 56 of the locking lever 55 is moved to the first position or the second one as illustrated in FIG. 8. At the first position, the locking lever 55 is engaged with the tooth 18b of the ratchet wheel 18 so that the rotation of the ratchet wheel 18 can be stopped, and at the second position, the locking lever 55 is not engaged with the tooth 18b of the ratchet wheel 18.

Figure 6:
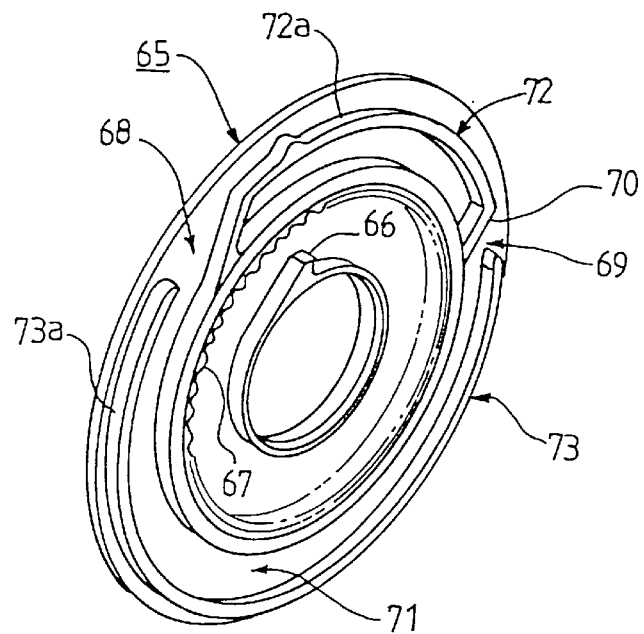
FIG. 6 is an overall enlarged perspective view of the control plate illustrated in FIG. 3.
Figure 7:
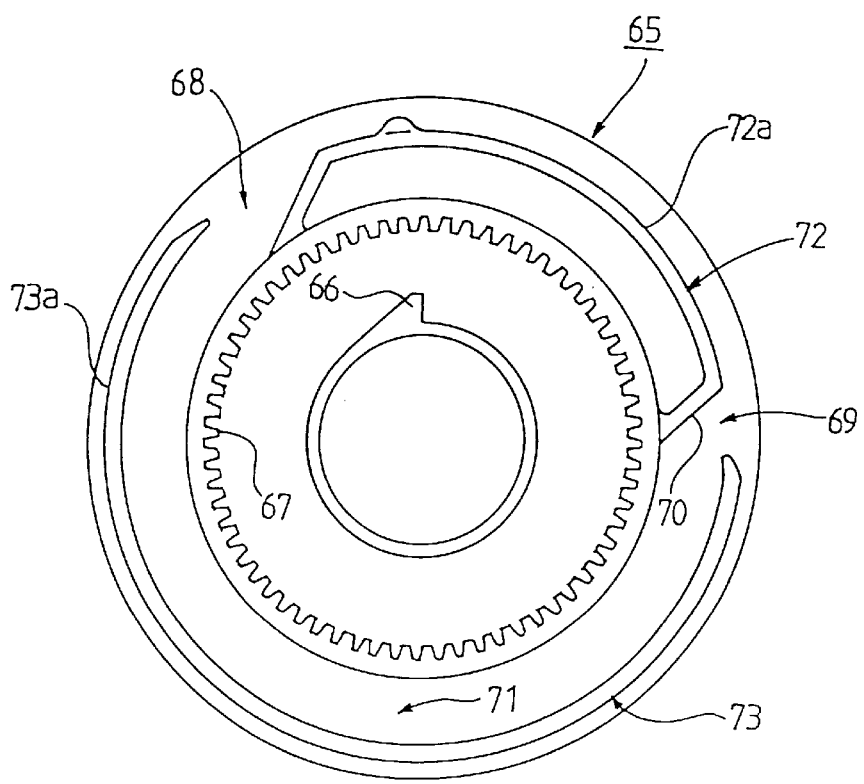
FIG. 7 is a front view of the control plate illustrated in FIG. 6.

The control mechanism provided between the control plate 65 and the locking lever 55 according to the first example of the present invention, in which the engaging portion 56 of the locking lever 55 is held at the second position when the webbing 50 is drawn out by the first predetermined amount, the engaging portion 56 is displaced from the second position to the first one when the webbing 50 is wound by the first predetermined amount after the webbing 50 has been thus drawn out beyond the first predetermined amount, and the engaging portion 56 is displaced from the first position to the second one when the webbing 50 is wound by an amount not less than the second predetermined amount, is constructed as follows. As illustrated in FIGS. 5 to 7, the first control mechanism of the first example includes: an outer circumferential wall 72, 73 for forming an outside cam surface 72a, 73a to hold the engaging portion 56 at the second position where the engaging portion 56 is not engaged with the ratchet wheel 18 when the engaging protrusion 59 of the locking lever 55 is located close to the outer circumference of the control plate; an inside cam groove 71 arranged inside the outer circumferential wall 73 for preventing the engaging portion 56 from being displaced from the first position where the engaging portion 56 is engaged with the ratchet wheel 18, to the second position undesirably when the engaging protrusion 59 is located close to the inner circumference of the control plate; an introducing portion 68 capable of introducing the engaging protrusion 59 into the inside cam groove 71 when the webbing 50 is drawn out by an amount not less than the first predetermined amount which is a little smaller than all the amount of webbing 50 to be drawn out; a guide portion 69 having a cam surface 70 for displacing the engaging protrusion 59 from the inside cam groove 71 to the outside cam surface 72a when the webbing 50 is wound by an amount not less than the second predetermined amount which is a little smaller than all the amount of webbing to be wound; a flexible engaging portion 60 of the locking lever 55; and an engaging protrusion 66 to be engaged with the flexible engaging portion 60.

Next, operation of the above retractor for seat belt will be explained as follows.

Figure 13:
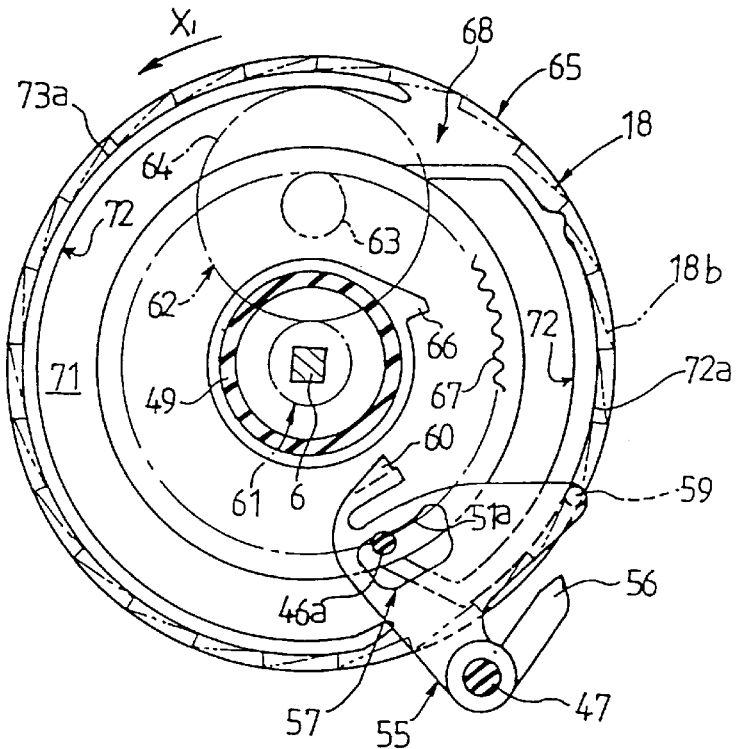
FIG. 13 is an enlarged view for explaining operation of the primary portion of the automatic locking mechanism.

As illustrated in FIG. 13, when all the amount of webbing is wound, the engaging protrusion 59 of the locking lever 55 is located on the outside cam surface 72a of the control plate 65. At this time, the locking lever 55 is moved to the second position, at which the engaging portion 56 is not engaged with the ratchet wheel 18, by an elastic pushing force acted on the cam surface 57a by the elastic protrusion 46a. Therefore, the locking lever 55 is not engaged with the tooth 18b. Accordingly, the ratchet wheel 18 can be rotated integrally with the bobbin 3.

Next, when the webbing starts being drawn out from the retractor, the bobbin 3 starts rotating in the direction of arrow $X_2$. Therefore, the main gear 61, which is fixed to the rotating support shaft 6 rotated together with the bobbin 3, also starts rotating in the same direction.

Figure 14:
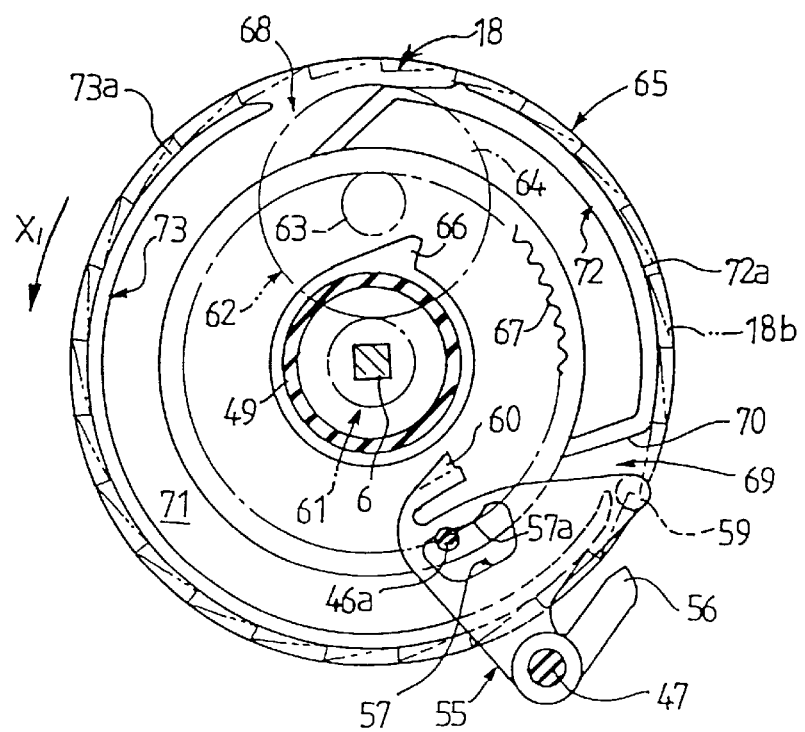
FIG. 14 is an enlarged view for explaining operation of the primary portion of the automatic locking mechanism.

Then, the control plate 65 starts rotating in the direction of arrow X1 while the speed is reduced by the action of the idle gear 62, and the engaging protrusion 59 of the locking lever 55 follows the outside cam surface 72a. When the engaging protrusion 59 comes to the guide portion 69 of the control plate 65 as illustrated in FIG. 14, since an elastic pushing force, by which the engaging portion 56 is moved to the second position where the engaging portion 56 is not engaged with the ratchet wheel 18, acts on the cam surface 57a of the locking lever 55 by the action of the elastic protrusion 46a. Accordingly, there is no possibility that the engaging protrusion 59 enters the inside cam groove 71 from the guide portion 69.

As described above, while the engaging protrusion 59 is located on the outside cam surface 72a, 73a of the control plate 65, the engaging portion 56 of the locking lever 55 is not meshed with the tooth 18b of the ratchet wheel 18, that is, the retractor is in the normal emergency locking condition, and the automatic locking mechanism is not operated.

Figure 10:
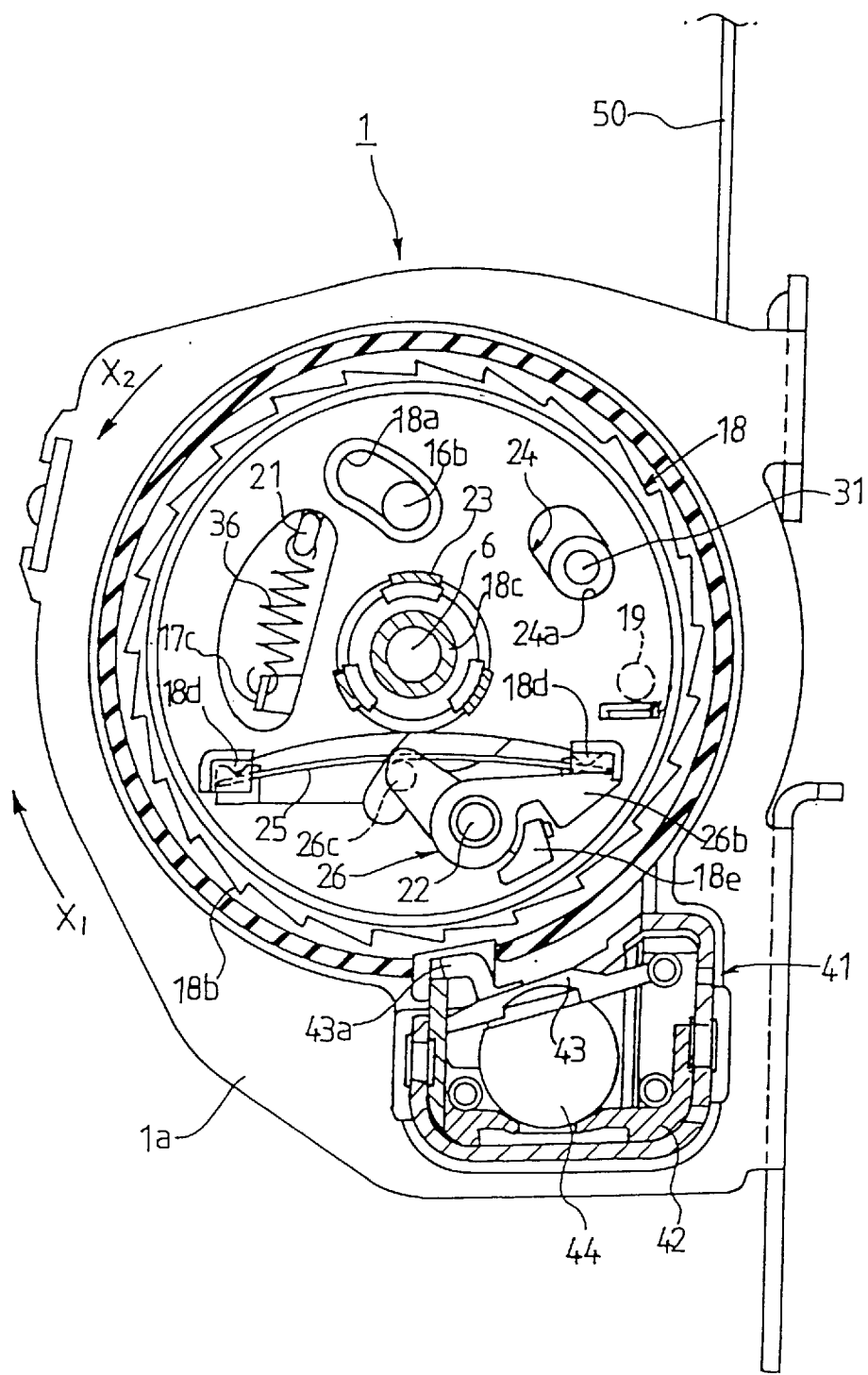
FIG. 10 is a primary cross-sectional view for explaining a drawing and locking motion of the webbing.
Figure 11:
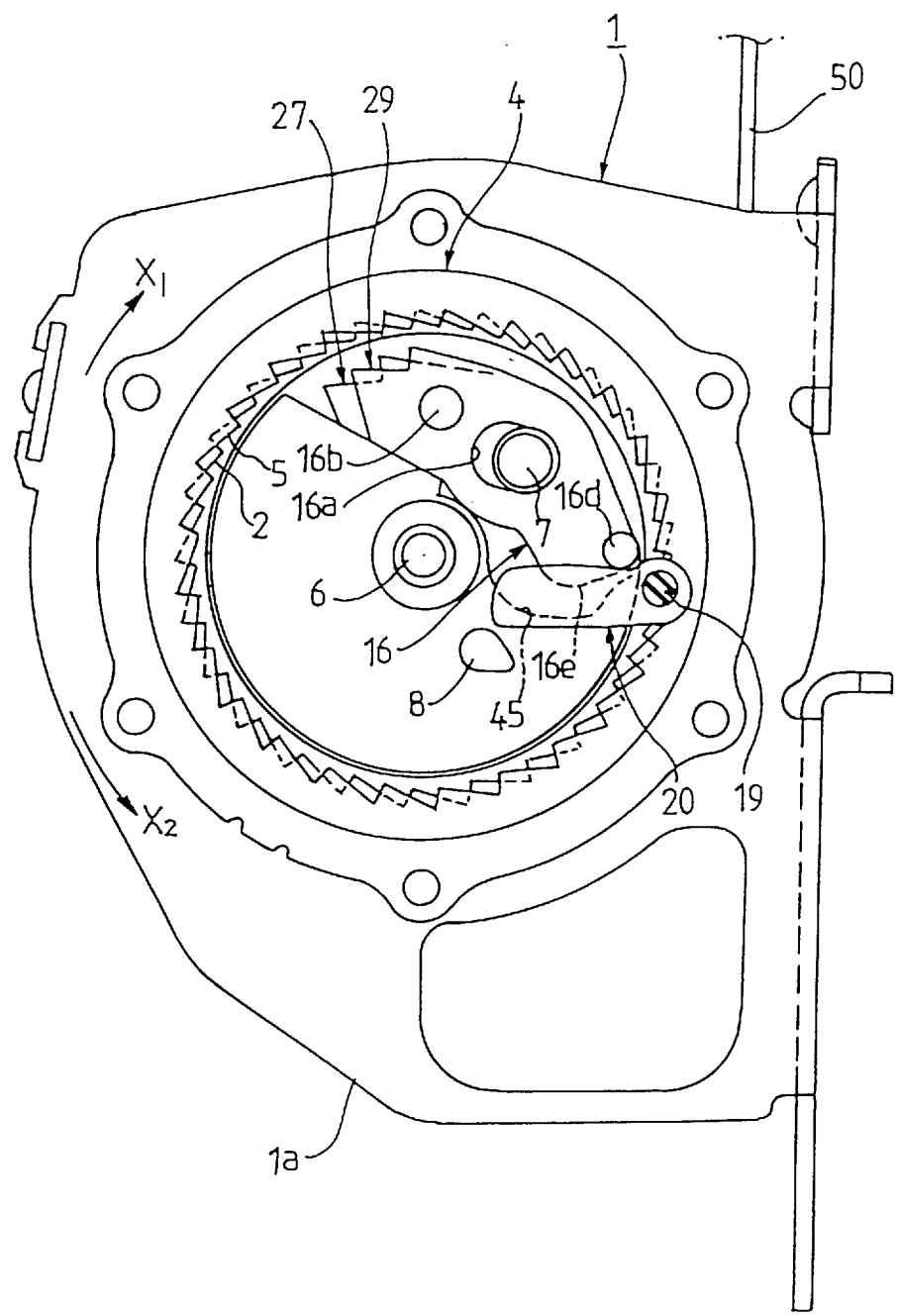
FIG. 11 is a primary cross-sectional view for explaining a drawing and locking motion of the webbing.

As illustrated in FIG. 10, in the normal operation, the ratchet wheel 18 is pushed by a pushing force of the tensile coil spring 36 arranged between the spring hooking portion 21 and the hooking portion 17c of the holding plate 17 in the direction of drawing out the webbing from the bobbin 3 (the direction of arrow $X_2$). Accordingly, the pawl 16, the cam hole 18a of which is engaged with the engaging protrusion 16b, is pushed in a direction in which it is not engaged with the engaging inner teeth 2, 5 of the first row and the second one. Therefore, the bobbin 3 can be rotated, and the webbing can be freely drawn out.

When a ball weight 44 of the vehicle acceleration detecting means 41 is placed at a predetermined position in the sensor case 42 as illustrated in FIG. 10, an engaging protrusion 43a of the sensor arm 43 is not engaged with the ratchet tooth 18b of the ratchet wheel 18. Accordingly, the ratchet wheel 18 is rotated together with the bobbin 3.

Figure 9:
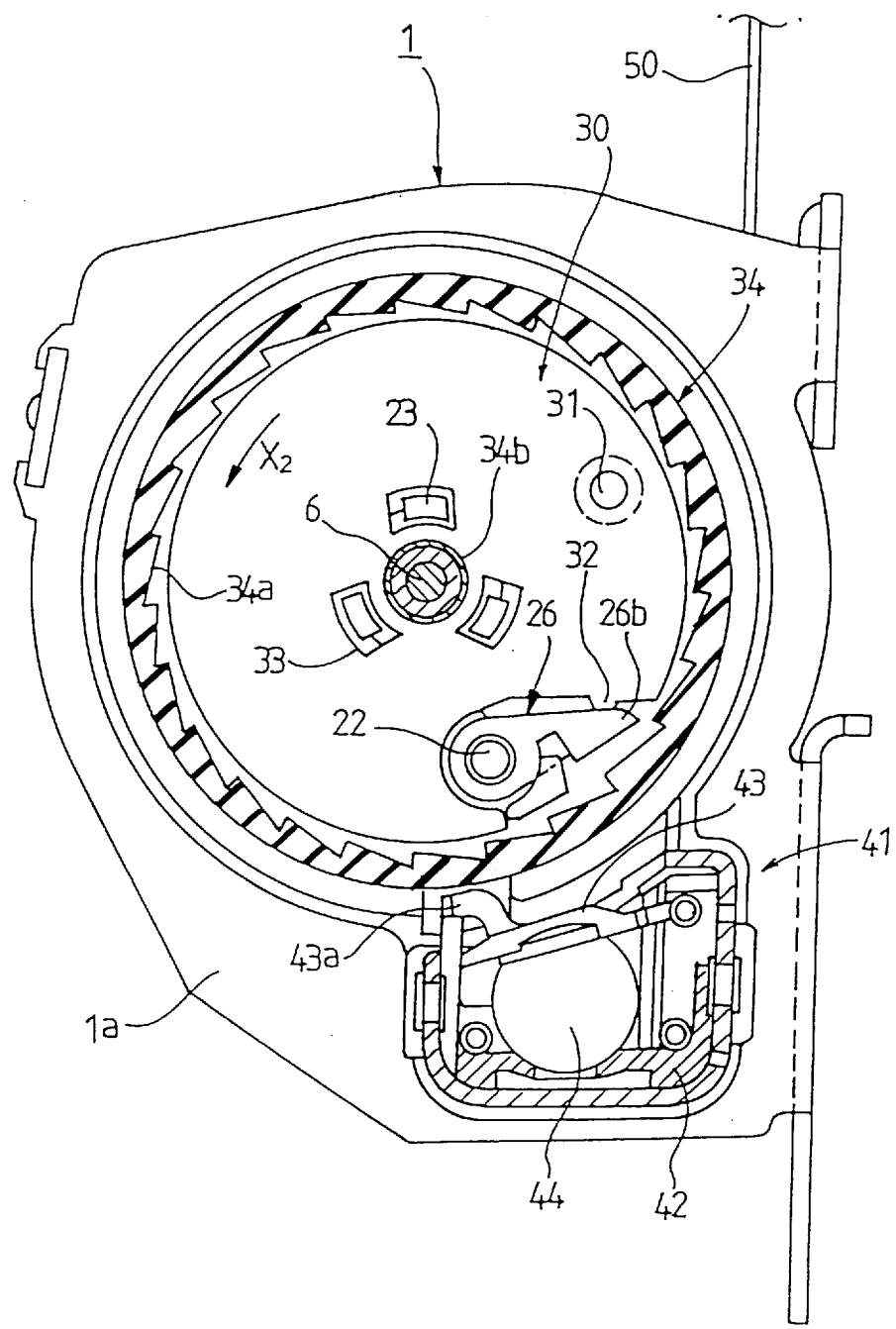
FIG. 9 is a primary cross-sectional view for explaining a drawing and locking motion of the webbing.

As illustrated in FIGS. 9 and 10, an engaging claw 26b of the locking arm 26 of the webbing acceleration detecting means is pushed to a position where it is not engaged with the inner tooth gear 34a in the gear case 34, by a pushing force of the sensor spring 25. The inertia plate 30 is pushed by the engaging claw 26b with respect to the ratchet wheel 18 in a direction so that the webbing can be drawn out (the direction of arrow $X_2$). As illustrated in FIGS. 9 and 10, the engaging protrusion 31 of the inertia plate 30 is pushed to one end edge 24a of the long hole 24, so that the rotational position of the inertia plate 30 can be determined. Therefore, the inertia plate 30 is rotated integrally with the bobbin 3 via the ratchet wheel 18.

When the vehicle acceleration detecting means 41, which is an inertia detecting means, or the webbing acceleration detecting means is operated in the case of emergency such as a vehicle collision, the sensor arm 43 or the locking arm 26, which is an engaging means for stopping the rotation of the locking operation means in the direction of drawing the webbing, stops the rotation of the ratchet wheel 18 in the direction of drawing the webbing, and the locking means of the retractor is operated.

After the vehicle acceleration detecting means 41 or the webbing acceleration detecting means has been operated and the rotation of the ratchet wheel 18 in the webbing drawing direction has been stopped, the webbing 50 is further drawn out from the retractor. Then, the rotation of the ratchet wheel 18 is delayed from the rotation of the bobbin 3. Therefore, the ratchet wheel 18 is relatively rotated in the webbing winding direction (the direction of arrow $X_1$). Accordingly, the cam hole 18a of the ratchet wheel 18 pushes and moves the engaging protrusion 16b of the pawl 16 from the rotating central axis of the bobbin 3 to the outward in the radial direction. Accordingly, the pawl 16 is oscillated round the support shaft 7 in a direction so that it can be meshed with the engaging inner teeth 2, 5 of the first row and the second one, that is, the pawl 16 is oscillated round the support shaft 7 in the direction of arrow $Y_1$, in FIG. 2).

Figure 12:
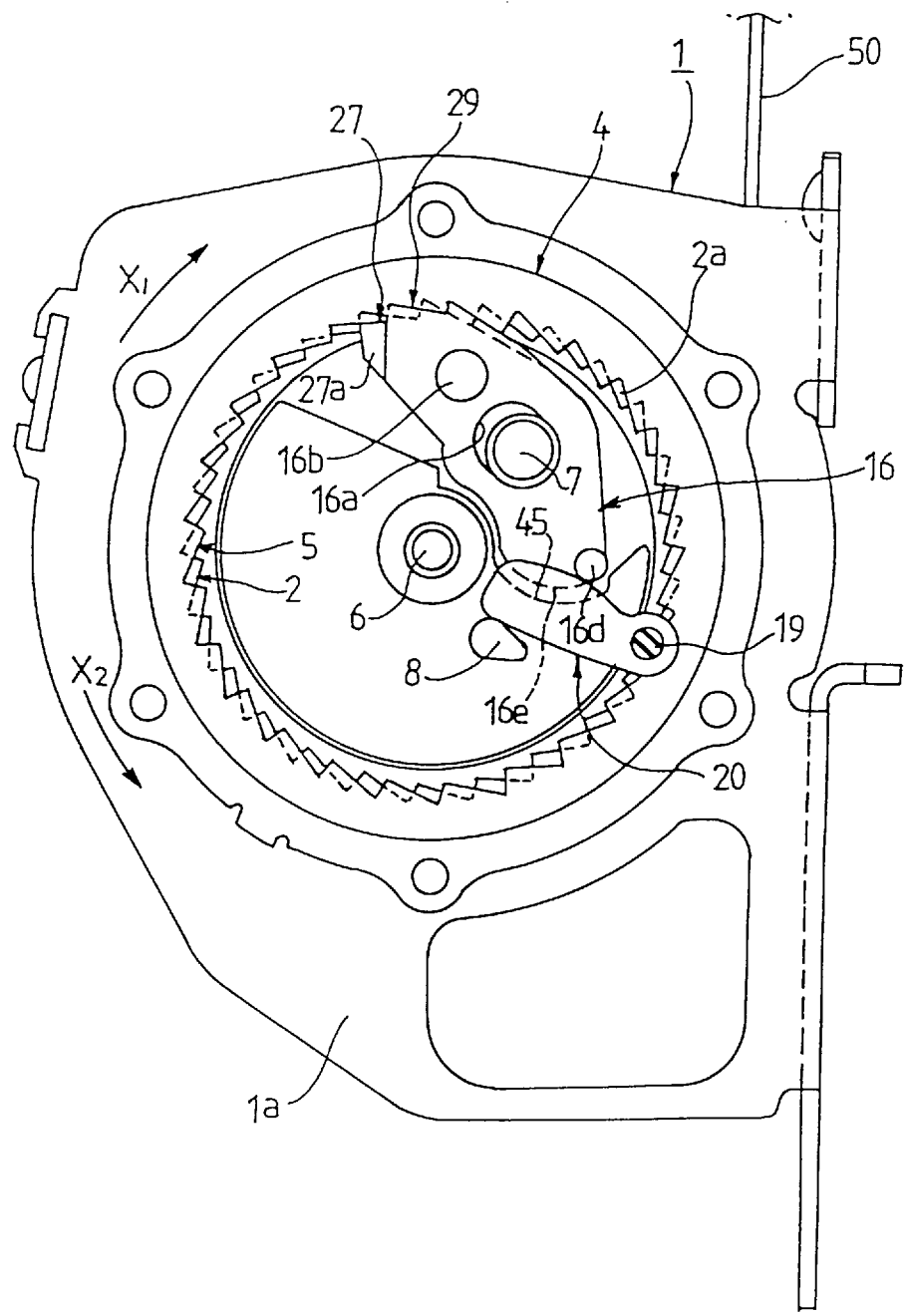
FIG. 12 is a primary cross-sectional view for explaining a drawing and locking motion of the webbing.

When the webbing 50 is further drawn out from the retractor, as illustrated in FIG. 12, the engaging teeth 27, 29 of the first row and the second one of the pawl 16 are respectively meshed with the engaging inner teeth 2, 5 of the first row and the second one. In the above condition, there is provided a clearance between the rear end portion 16e of the pawl 16 and the pressure receiving surface 45 of the bobbin 3, and the rotation of the oscillating lever 20 is restricted by the engaging protrusion 8 of the bobbin 3 and the pushing protrusion 16d of the pawl 16 without providing any play.

The shaft hole 16a of the pawl 16 is idly engaged with the support shaft 7 of the bobbin 3. That is, the shaft hole 16a of the pawl 16 is engaged with the support shaft 7 of the bobbin 3 while the pawl 16 can be relatively oscillated and moved with respect to the bobbin 3. When the webbing 50 is further drawn out from the retractor, the pawl 16 is relatively rotated with respect to the bobbin 3 round the rotating central shaft of the bobbin 3 until the rear end portion 16e of the pawl comes into contact with the pressure receiving surface 45.

In this case, the pushing protrusion 16d of the pawl 16 is not moved with respect to the side plate 1a, however, the engaging protrusion 8 of the bobbin 3 is rotated in the webbing drawing direction (the direction of arrow $X_2$). Due to the above movements, an oscillating end portion of the oscillating lever 20 is pushed by the engaging protrusion 8 at the fulcrum of the contact point with the pushing protrusion 16*d*. Therefore, the oscillating lever 20 is oscillated clockwise in FIG. 12. When the oscillating lever 20 is oscillated clockwise in FIG. 12 at the fulcrum of the contact point with the pushing protrusion 16*d*, the shaft hole 20*a* supported by the support shaft 19 of the ratchet wheel 18 is rotated in the webbing winding direction (the direction of arrow $X_1$) with respect to the rotating central axis of the bobbin 3. As a result, the ratchet wheel 18 is reversed in the webbing winding direction (the direction of arrow $X_1$) with respect to the bobbin 3.

Accordingly, even when the vehicle acceleration detecting means 41 or the webbing acceleration detecting means is operated and the retractor is put in a locking condition in which the locking means of the retractor prevents the bobbin 3 from rotating in the webbing drawing direction, the ratchet wheel 18, the rotation in the webbing drawing direction of which is prevented, can be put in a free condition in which the sensor arm 43 of the vehicle acceleration detecting means 41, or the locking arm 26 of the webbing acceleration detecting means can be released from the engagement with the inner tooth gear 34*a* in the gear case 34.

When the webbing 50 is given a higher tension in the above locking condition of the pawl 16, a shaft support portion of the gear case 34 and a portion of the winding spring device 15 which supports the retainer 51 are deformed so as to move the bobbin 3 upward. However, the above movement is stopped when the contact surface 3*a* and the groove 3*b* formed on the bobbin are respectively contacted with the engaging inner teeth 2, 5 of the first row and the second one, and the engaging inner teeth 52 of the third row. Therefore, the tension acting on the webbing is received by these surfaces.

After the vehicle has been stopped and the tension acting on the webbing 50 has been released, the ratchet wheel 18 is disengaged from the inner tooth gear 34*a* of the gear case 34 by the sensor arm 43 or the locking arm 26. Accordingly, the ratchet wheel 18 is rotated with respect to the bobbin 3 in the direction of arrow $X_2$ by a pushing force of the tensile coil spring 36. Therefore, the cam hole 18*a* of the ratchet wheel 18 moves the engaging protrusion 16*b* of the pawl 16 toward the rotating central axis of the bobbin 3. At this time, the tension to draw out the webbing 50 is released as described above, so that the bobbin 3 can be rotated in the webbing winding direction (the direction of arrow $X_1$). Therefore, when the bobbin 3 is rotated in the direction of arrow $X_1$ so that the front ends of the engaging teeth 27, 29 of the first row and the second one of the pawl 16 can not respectively interfere with the front ends of the engaging inner teeth 2, 5 of the first row and the second one, the pawl 16 is oscillated round the support shaft 7 in a direction so that the engagement with the engaging inner teeth 2, 5 of the first row and the second one can be released. In this way, the bobbin 3 can be unlocked, and the webbing can be freely drawn out.

When the vehicle acceleration detecting means 41 or the webbing acceleration detecting means is operated by a shock caused when all webbing 50 has been quickly wound by a spring force of the winding spring device 15, the bobbin 3 is locked so that it can not be rotated in the webbing drawing direction, and the retractor is put into an end lock condition in which drawing and winding can not be performed. In the above case, the ratchet wheel 18 and the sensor arm 43 are engaged with each other, or the lock arm 26 and the inner tooth gear 34*a* of the gear case 34 are engaged with each other, however, the pawl 16 is not engaged with the engaging inner teeth 2, 5 of the first row and the second one. Accordingly, when the webbing 50 is drawn out in the above condition, the pawl 16 is engaged with the engaging inner teeth 2, 5 of the first row and the second one, and then the bobbin 3 is rotated until the rear end portion 16*e* of the pawl 16 comes into contact with the pressure receiving surface 45. At this time, the ratchet wheel 18 is reversed by the oscillating lever 20 in the webbing winding direction (the direction of arrow $X_1$) with respect to the bobbin 3. Therefore, the ratchet wheel 18 and the sensor arm 43 are disengaged from each other, and the lock arm 26 and the inner tooth gear 34*a* in the gear case 34 are also disengaged from each other. When the webbing 50 is returned to the initial winding position, the pawl 16 is disengaged from the engaging inner teeth 2, 5 of the first row and the second one. In this way, the end locking condition is released.

Figure 15:
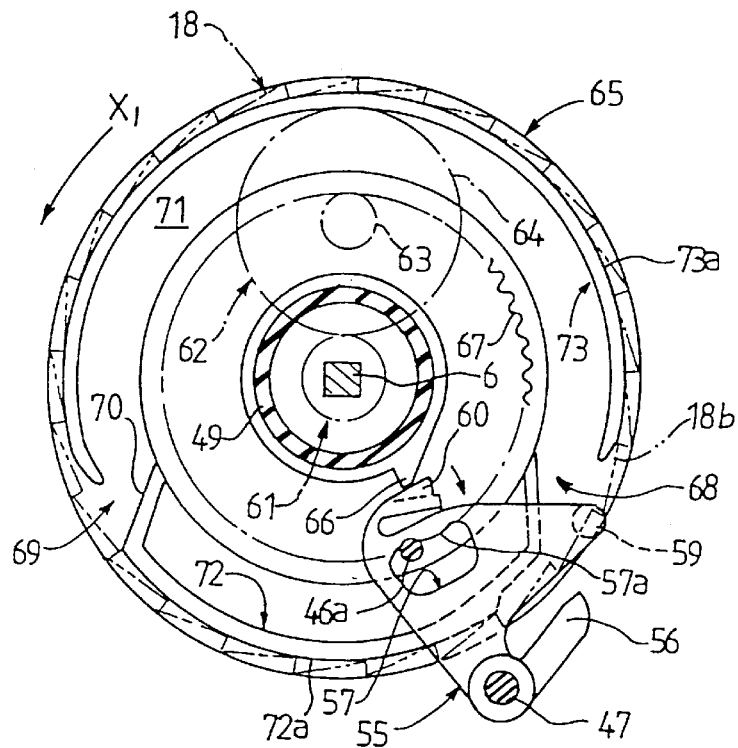
FIG. 15 is an enlarged view for explaining operation of the primary portion of the automatic locking mechanism.
Figure 16:
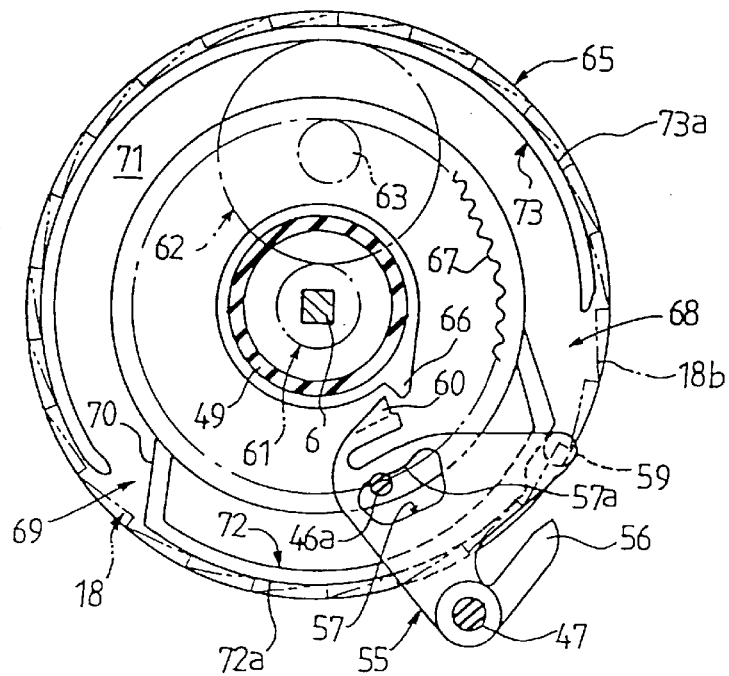
FIG. 16 is an enlarged view for explaining operation of the primary portion of the automatic locking mechanism.

Then, the webbing 50 is drawn out by an amount not less than the first predetermined amount which is a little smaller than all the amount of webbing, and the engaging portion 56 of the locking lever 55 reaches a position close to the introducing portion 68 of the control plate 65. At this time, the flexible engaging portion 60 of the locking lever 55 is engaged with the engaging protrusion 66 of the control plate 65. When the webbing is drawn out, the flexible engaging portion 60 and the engaging protrusion 66 come into contact with each other in such a manner than both the tapered surfaces are opposed to each other, and the flexible engaging portion 60 deflects and gets over the engaging protrusion 66 as illustrated in FIG. 15. Accordingly, the engaging protrusion 66 can pass through as it is. In the condition illustrated in FIG. 16 in which all webbing has been drawn out, the engaging portion 56 of the locking lever 55 remains at the second position at which the engaging portion 56 of the locking lever 55 is not engaged with the tooth 18*b* of the ratchet wheel 18.

Accordingly, when the flexible engaging portion 60 of the locking lever 55 is engaged with the engaging protrusion 66 of the control plate 65 by drawing out the webbing 50 by an amount not less than the first predetermined amount, the locking lever 55 remains in an emergency locking mechanism operating condition in which the locking lever 55 is held at the second position where it is not engaged with the tooth 18*b* of the ratchet wheel 18. Consequently, there is provided a sufficient clearance between the engaging portion 56 of the locking lever 55 and the tooth 18*b* of the ratchet wheel 18. Therefore, the retractor is put in a stable emergency locking mechanism operating condition. Accordingly, there is no possibility that all the webbing 50 can not be drawn out when the engaging portion 56 of the engaging member is engaged with the tooth 18*b* depending upon the fluctuation of accuracy of parts and assembly.

After all the webbing 50 has been drawn out from the retractor, it starts to be wound round the retractor, and the bobbin 3 starts rotating in the direction of arrow $X_1$. When the bobbin 3 starts rotating, the rotating support shaft 6 is rotated, and the main gear 61 fixed to the rotating support shaft 6 is also rotated in the same direction. Therefore, the control plate 65, the rotating speed of which is reduced by the idle gear 62, starts rotating in the direction of arrow $X_2$.

Figure 17:
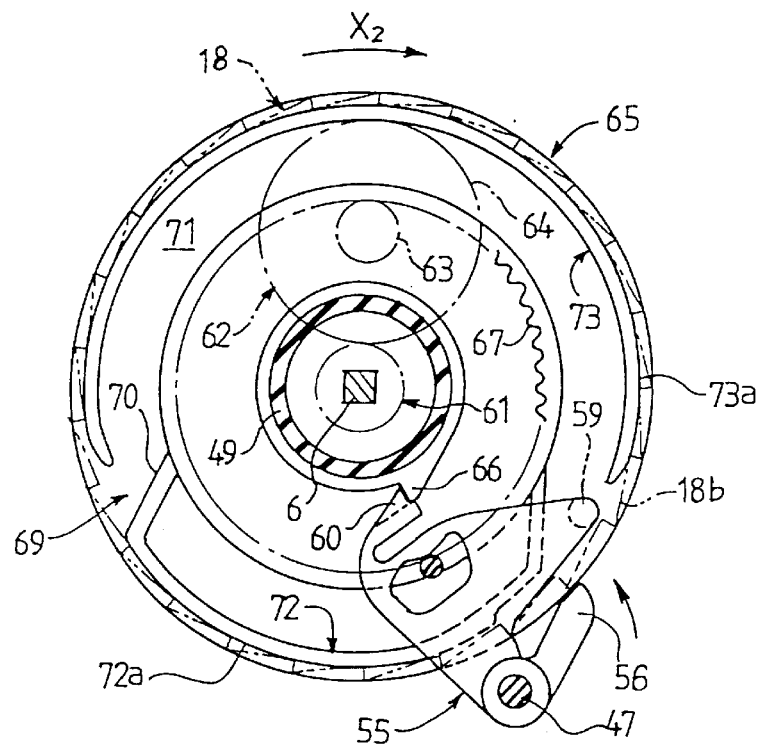
FIG. 17 is an enlarged view for explaining operation of the primary portion of the automatic locking mechanism.

After the webbing 50 has been wound by the first predetermined amount, the engaging protrusion 59 comes to the introducing portion 68 of the control plate 65. At this time, as illustrated in FIG. 17, the engaging protrusion 66 of the control plate 65 comes into contact with the flexible engaging portion 60 of the locking lever 55 in such a manner that their perpendicular surfaces are opposed to each other. For this reason, it is impossible for the flexible engaging portion 60 to be bent so as to get over the engaging protrusion 66. Therefore, the flexible engaging portion 60 is pushed by the engaging protrusion 66 of the control plate 65. Accordingly, the locking lever 55 is oscillated counterclockwise in the drawing.

Figure 21:
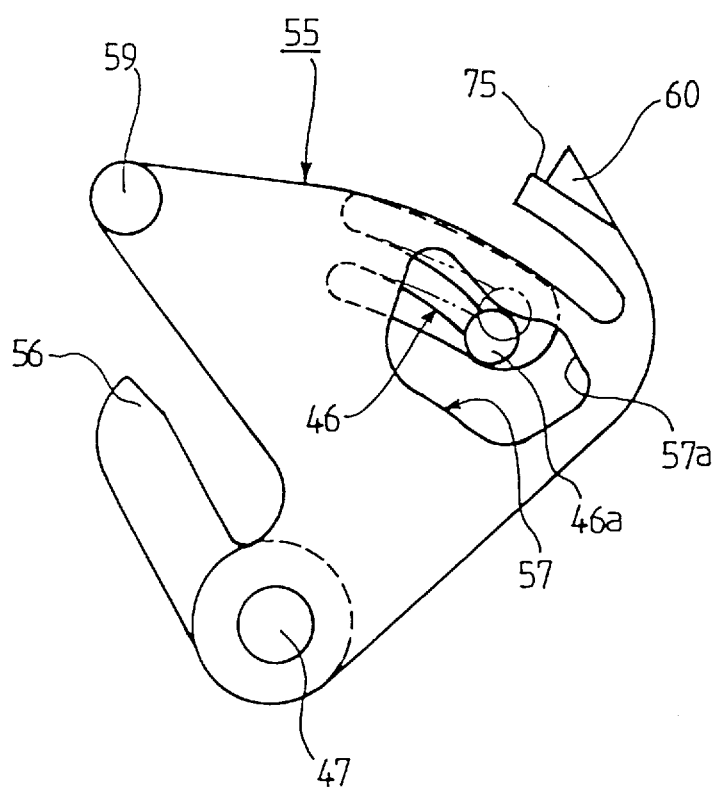
FIG. 21 is an enlarged view of the primary portion for explaining a motion of the locking lever when the automatic locking mechanism is operated.

Then, the elastic protrusion 46a pushing the engaging portion 56 to the second position via the cam surface 57a of the locking lever 55 bends the flexible piece 46 as illustrated in FIG. 21, and gets over the cam top which is a neutral position of the cam surface 57a. Accordingly, the locking lever 55 is clicked to a position at which the engaging portion 56 is moved to the first position where the engaging portion 56 is engaged with the tooth 18b of the ratchet 18 so as to prevent its rotation. In this connection, there is provided a step portion 75 at the front end portion of the flexible engaging portion 60 which comes into contact with the engaging protrusion 66. Accordingly, when it is engaged with the engaging protrusion 66, the flexible engaging portion 60 can be prevented from being deformed upward, so that the locking lever 55 can be surely oscillated counterclockwise in the drawing.

Figure 18:
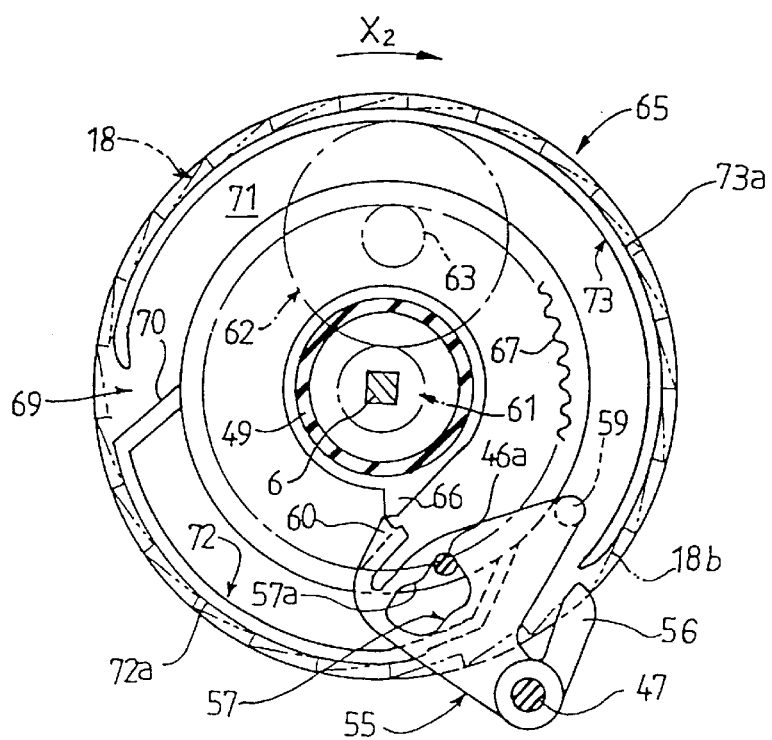
FIG. 18 is an enlarged view for explaining operation of the primary portion of the automatic locking mechanism.

When the webbing 50 is further wound round the retractor, as illustrated in FIG. 18, the engaging portion 56 is engaged with the tooth 18b of the ratchet 18, and at the same time the engaging protrusion 59 enters the inside cam groove 71.

That is, when the webbing 50 is wound a little by the first predetermined amount after all the amount of webbing 50 has been drawn out from the retractor, the engaging protrusion 66 of the control plate 65 directly pushes the flexible engaging portion 60 of the locking lever 55, and the locking lever 55 is positively oscillated from the second position where the engaging portion 56 is not engaged with the tooth 18b of the ratchet wheel 18, to the first position where the engaging portion 56 is engaged with the tooth 18b.

Accordingly, there is no possibility that the locking lever 55 stops at the neutral position of clicking motion by the fluctuation of accuracy of parts and assembly.

The elastic protrusion 46a pushes the cam surface 57a in a direction so that the engaging portion 56 can be moved to the second position. When a distance t (shown in FIG. 5) to the cam top which is a neutral position on the cam surface 57a is set at an appropriate value, it is possible to arbitrarily determine a changing position of the locking lever 55. That is, when the distance t is extended, an amount of the webbing 50 to be wound until the locking lever 55 is changed over to the first position is increased. When the distance t is shortened, the locking lever 55 can be changed over to the first position only when a small amount of the webbing 50 is wound on the condition that all the webbing has been drawn out.

Figure 19:
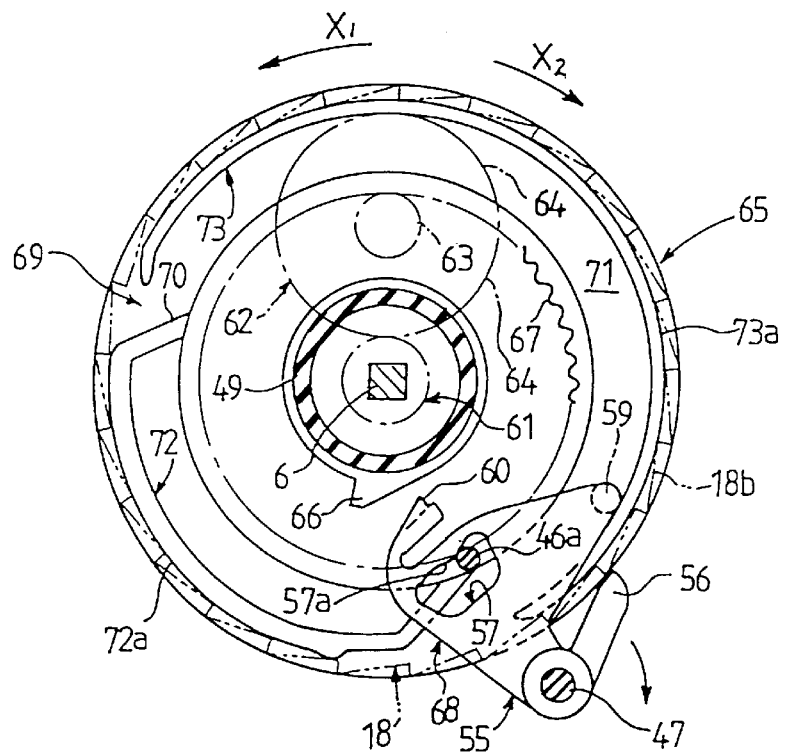
FIG. 19 is an enlarged view for explaining operation of the primary portion of the automatic locking mechanism.

When the webbing is wound round the retractor while the engaging portion 56 is engaged with the tooth 18b of the ratchet wheel 18, the bobbin 3 starts rotating in the direction of arrow $X_1$, and the ratchet wheel 18 also starts rotating in the same direction. As illustrated in FIG. 19, the locking lever 55 can be oscillated clockwise in the drawing while it resists a pushing force given by the elastic protrusion 46a of the flexible piece 46. Accordingly, the engaging portion 56 engaging with the tooth 18b of the ratchet wheel 18 gets over the tooth 18b while it is flipped by the tooth 18b. Therefore, the rotation of the ratchet wheel 18 is not obstructed. In this connection, height of the cam top is determined to be an appropriate value so that the elastic protrusion 46a can not get over the cam top when the engaging portion 56 is flipped by the tooth 18b.

On the other hand, when the webbing 50 is drawn out from the retractor and the bobbin 3 starts rotating in the direction of arrow $X_2$, the ratchet wheel 18 attempts to also rotate in the direction of arrow $X_2$. However, rotation of the ratchet wheel 18 in the webbing drawing direction is prevented by the engaging portion 56 of the locking lever 55 engaging with the tooth 18b. When the webbing 50 is further drawn out while the ratchet wheel 18 is prevented from rotating, the rotation of the ratchet wheel 18 is delayed with respect to the rotation of the bobbin 3 in the webbing drawing direction. Accordingly, the ratchet wheel 18 relatively rotates in the webbing winding direction (the direction of arrow $X_1$). Therefore, the locking means of the retractor is operated, and the cam hole 18a of the ratchet wheel 18 moves the engaging protrusion 16b of the pawl 16 from the rotating central shaft of the bobbin 3 to the outward in the radial direction. Therefore, the pawl 16 is oscillated round the support shaft 7 in the engaging direction (the direction of arrow $Y_1$ in FIG. 2) with the engaging inner teeth 2, 5 of the first row and the second one. As a result, rotation of the bobbin 3 in the direction of arrow $X_2$ is prevented, that is, the webbing is prevented from being drawn out. In this way, the retractor is locked.

While the locking lever 55 is pushed to the first position by the elastic protrusion 46a of the flexible piece 46 via the cam surface 57a, the engaging portion 56 of the locking lever 55 is meshed with the tooth 18b of the ratchet wheel 18 at all times, that is, the retractor is put in the automatic locking mechanism operating condition.

Figure 20:
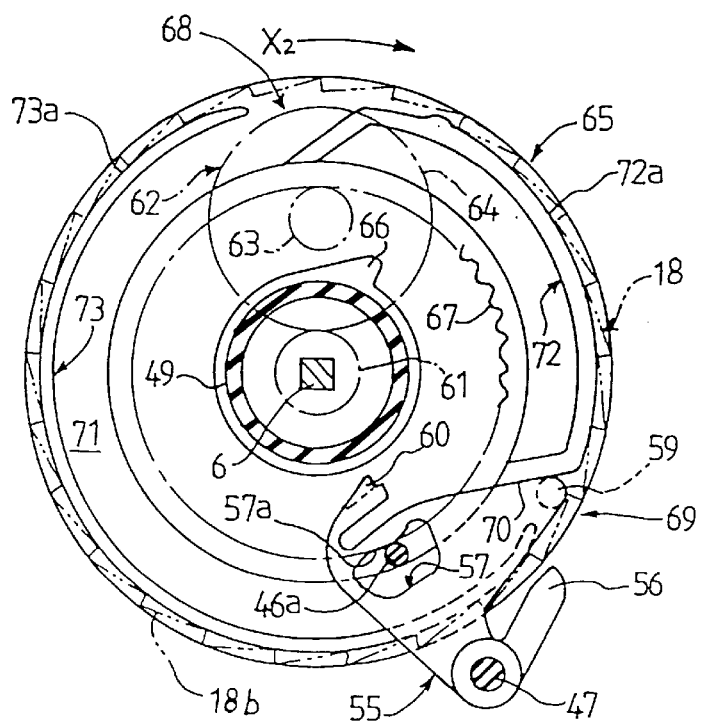
FIG. 20 is an enlarged view for explaining operation of the primary portion of the automatic locking mechanism.

When the webbing is wound in the above condition, the control plate 65 starts rotating in the direction of arrow $X_2$, and the engaging portion 56 of the locking lever 55 moves in the inside cam groove 71. When the webbing 50 is further wound by the second predetermined amount which is a little smaller than all the amount of webbing 50 to be wound, as illustrated in FIG. 20, the engaging protrusion 59 is displaced onto the outside cam surface 72a being pushed by the cam surface 70 formed in the guide section 69. Therefore, the locking lever 55 is oscillated in a direction so that the engaging portion 56 can be disengaged from the tooth 18b. Then, the elastic protrusion 46a pushing the engaging portion 56 to the first position via the cam surface 57a of the locking lever 55 bends the flexible piece 46 as illustrated in FIG. 21, and gets over the cam top which is a neutral position of the cam surface 57a. Accordingly, the locking lever 55 is clicked to a position at which the engaging portion 56 is moved to the second position where the engaging portion 56 is not engaged with the tooth 18b of the ratchet 18. In this way, the locking lever 55 is disengaged from the ratchet wheel 17. Then, all webbing is wound up while the emergency locking mechanism of the retractor is put in an operating condition. After that, all the webbing is drawn out, and then a small amount of the webbing is wound. In this way, only the emergency locking mechanism operating condition can be realized until the locking lever 55 is changed over to the first position.

The emergency locking mechanism operating condition can be converted into the automatic locking mechanism operating condition by conducting a very simple operation in which a small amount of the webbing is wound after all the webbing 50 has been drawn out.

Further, there is no possibility that all the webbing can not be drawn out because the engaging portion 56 is meshed with the tooth 18b due to the fluctuation of accuracy of parts and assembly before the retractor is changed over into the automatic locking mechanism operating condition by winding the webbing 50 a little after all the webbing 50 has been drawn out from the retractor. The engaging protrusion 66 of the control plate 65 directly pushes the flexible engaging portion 60 of the locking lever 55. Therefore, the locking lever 55 is positively oscillated from the second position to the first position. Accordingly, there is no possibility that the locking lever 55 is stopped at the neutral position in the clicking motion due to the fluctuation of accuracy of parts and assembly.

Accordingly, it is not necessary to enhance the assembling accuracy of the speed reduction means composed of the idle gear 62 and the main gear 61. Also, it is not necessary to enhance the assembling accuracy of the control plate 65, the locking lever 55 and so forth. Therefore, it is easy to manufacture and assemble the parts to compose the controlling means.

Figure 22:
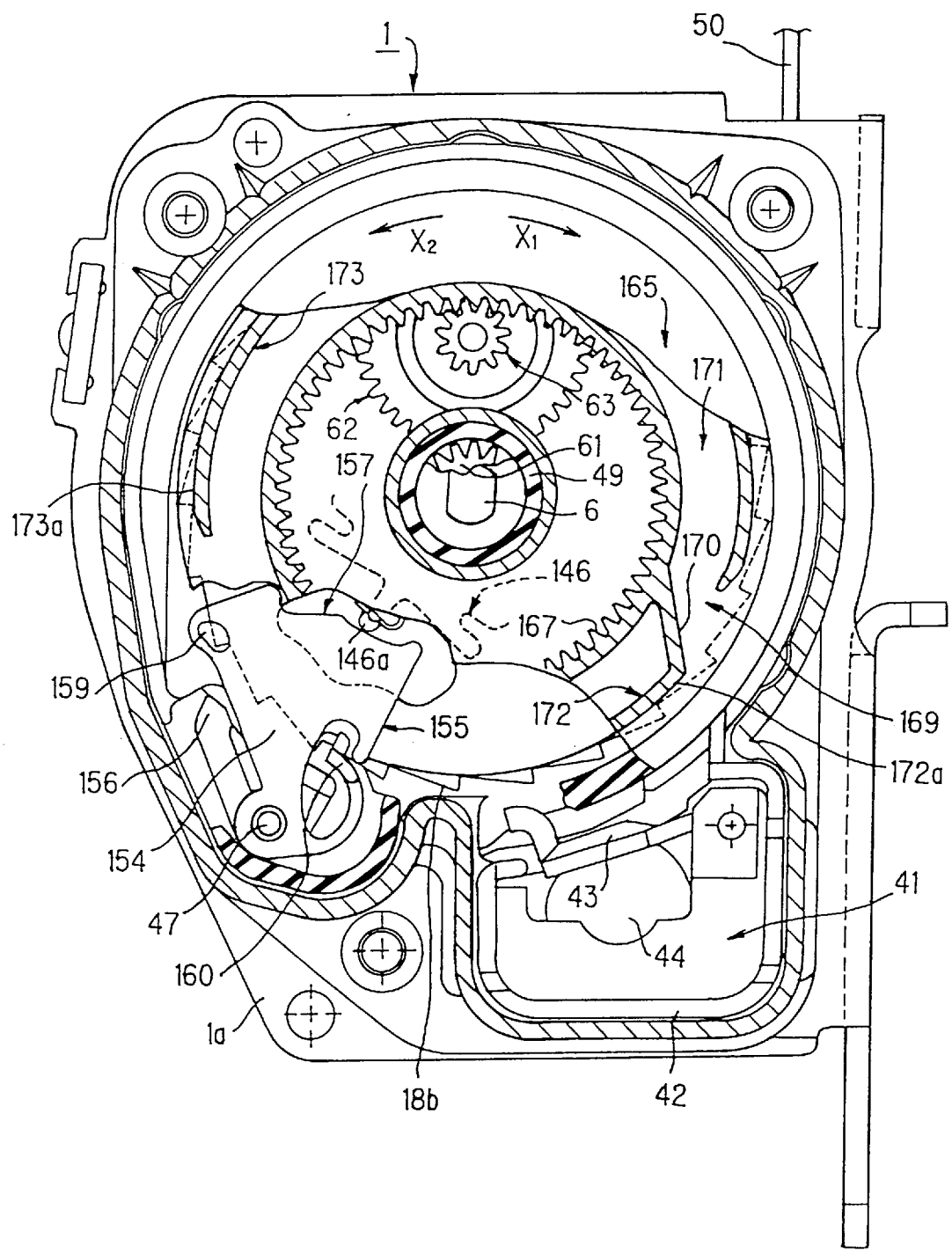
FIG. 22 is a partially cutaway side view of the retractor for seat belt according to the second example of the present invention.
Figure 23:
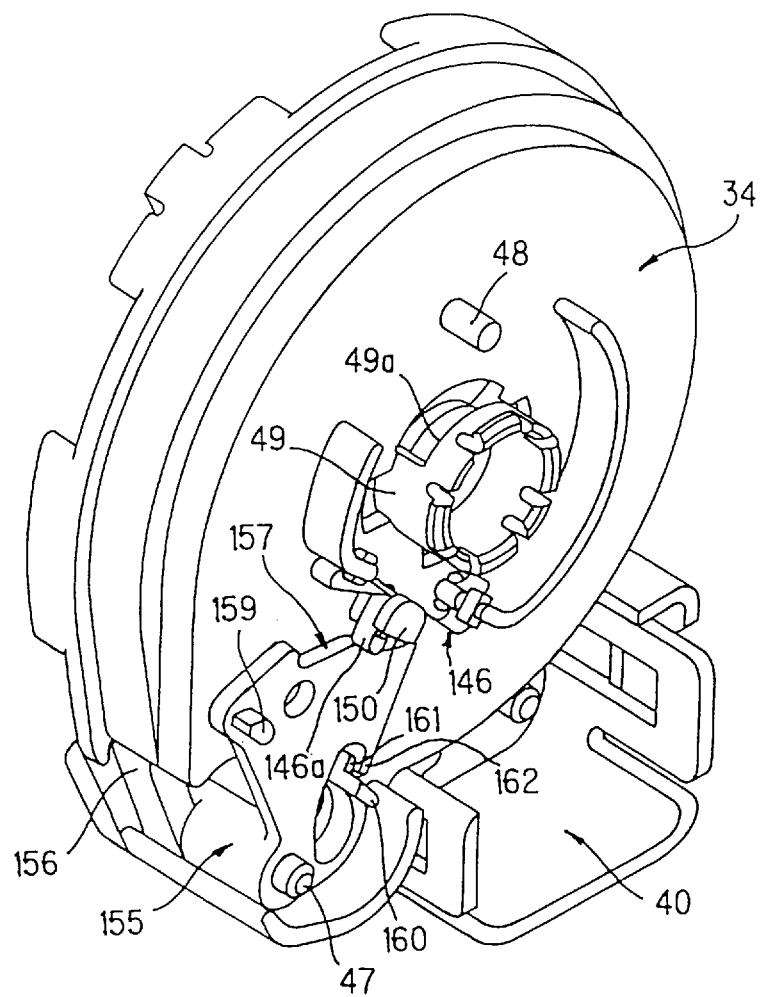
FIG. 23 is an enlarged perspective view of the primary portion of the retractor for seat belt illustrated in FIG. 22.
Figure 24:
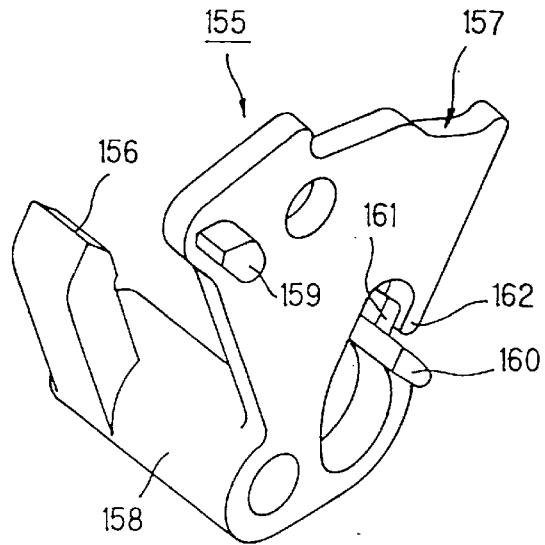
FIG. 24 is an overall enlarged perspective view of the locking lever illustrated in FIG. 22.

FIGS. 22 and 23 are respectively a partially cutaway side view of the retractor for seat belt according to the second example of the present invention and an enlarged perspective view of the primary portion of the same. In the retractor for seat belt of the second example of the present invention, instead of the above control plate 65, locking lever 55 and flexible piece 46 composing the control mechanism, there are provided a control plate 165, locking lever 155 and return spring 146. Except for that, the construction of the retractor for seat belt of the second example is the same as that of the retractor for seat belt of the first example. Therefore, like reference characters are used to indicate like parts, and the detailed explanations are omitted here.

As illustrated in FIGS. 22 to 25, the locking lever 155 includes: a cylindrical portion 158 idly inserted into the support shaft 47; an engaging portion 156 and an oscillating piece 154 extending radially outward from the cylindrical portion 158; an engaging protrusion 159 and a flexible engaging portion 160 protruding from an oscillating end of the oscillating piece 154 so as to be engaged with the control plate 165; and a cam surface 157 formed at an oscillating end portion of the oscillating piece 154.

The cam surface 157 is engaged with an elastic protrusion 146a of the return spring 146 arranged on the outer wall of the gear case 34. The locking lever 155 is pushed by an elastic pushing force acted on the cam surface 157 caused by the elastic protrusion 146a in a direction so that the engaging portion 156 can be moved to the first position or the second position. At the first position, the locking lever 155 is engaged with the tooth 18b of the ratchet wheel 18 so that the rotation of the ratchet wheel 18 can be stopped, and at the second position, the locking lever 155 is not engaged with the tooth 18b of the ratchet wheel 18. That is, when the elastic protrusion 146a gets over a top of the cam which is a neutral position of the cam surface 157, the locking lever 155 conducts a click motion so that the engaging portion 156 can be held at the first position or the second one.

Figure 25:
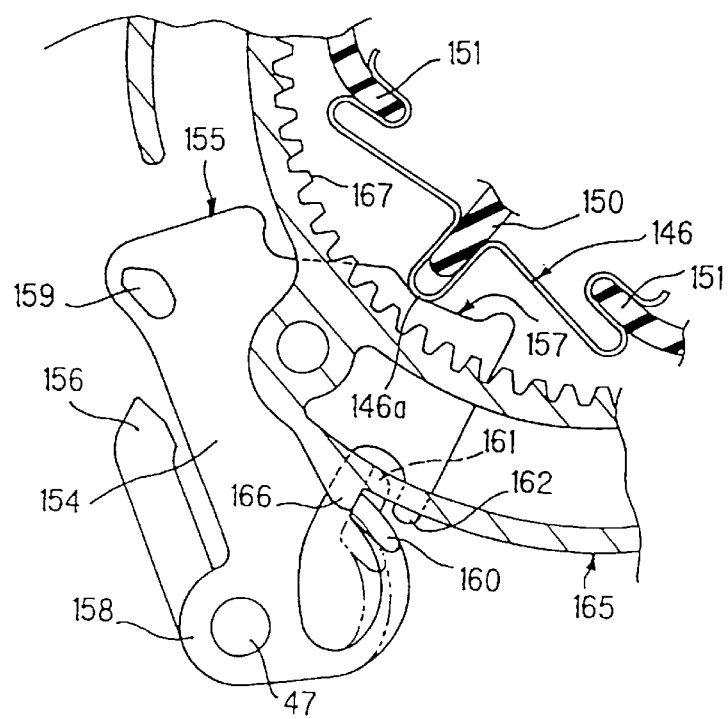
FIG. 25 is a front view of the locking lever illustrated in FIG. 22.

As illustrated in FIG. 25, the return spring 146 is composed of a bent leaf spring, at the center of which an elastic protrusion 146a is provided. Both end portions of the return spring 146 are held by the support portions 151, 151 which protrude from the outer wall of the gear case 34. The elastic protrusion 146a is held in such a manner that it can be elastically advanced and withdrawn along the guide portion 150.

The engaging protrusion 159 is engaged with a cam surface of the control plate 165 composing the control mechanism. The locking lever 155 is oscillated along the cam surface. The flexible engaging portion 160 is engaged with the engaging protrusion 166 of the control plate 165 which composes a control mechanism together with the locking lever 155. When the webbing is drawn out, the flexible engaging portion 160 and the engaging protrusion 166 come into contact with each other in such a manner that both tapered surfaces are opposed to each other. As illustrated by an imaginary line in FIG. 25, the flexible engaging portion 160 is bent so that the flexible engaging portion 160 gets over the engaging protrusion 166, that is the flexible engaging portion 160 is separated from the engaging protrusion 166. Therefore, the engaging protrusion 166 of the control plate 165 passes through as it is. However, when the webbing is wound, their perpendicular surfaces come into contact with each other in such a manner that they are opposed to each other, and at the same time the engaging portion 161 of the oscillating end comes into contact with the stopper 162, so that the deformation can be suppressed. Accordingly, it is impossible for the flexible engaging portion 160 to be bent, so that the flexible engaging portion 160 can not get over the engaging protrusion 166. Since the flexible engaging portion 160 is pushed by the engaging protrusion 166 of the control plate 165, the locking lever 155 is oscillated clockwise in FIG. 25.

Therefore, the engaging portion 156 of the locking lever 155 is moved to the first position or the second one. At the first position, the locking lever 155 is engaged with the tooth 18b of the ratchet wheel 18 so that the rotation of the ratchet wheel 18 can be stopped, and at the second position, the locking lever 155 is not engaged with the tooth 18b of the ratchet wheel 18 (Refer FIG. 22).

Figure 26:
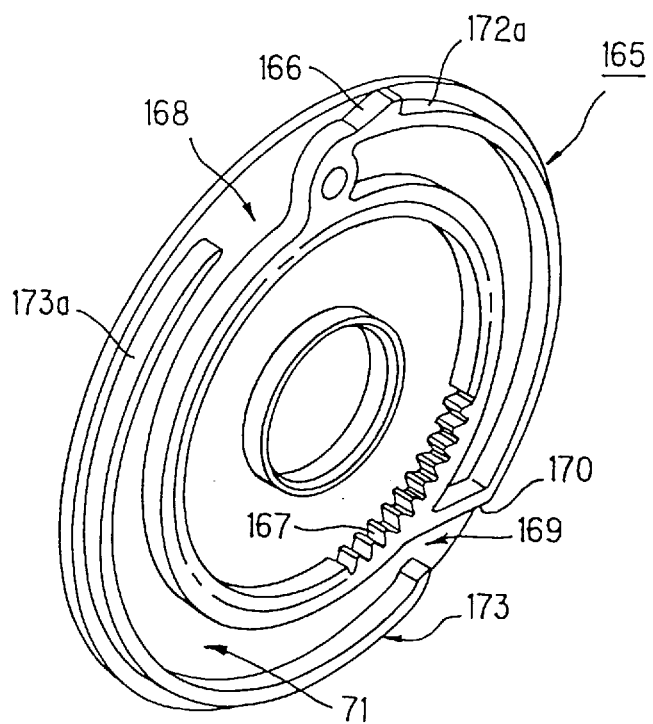
FIG. 26 is an overall enlarged perspective view of the control plate illustrated in FIG. 22.
Figure 27:
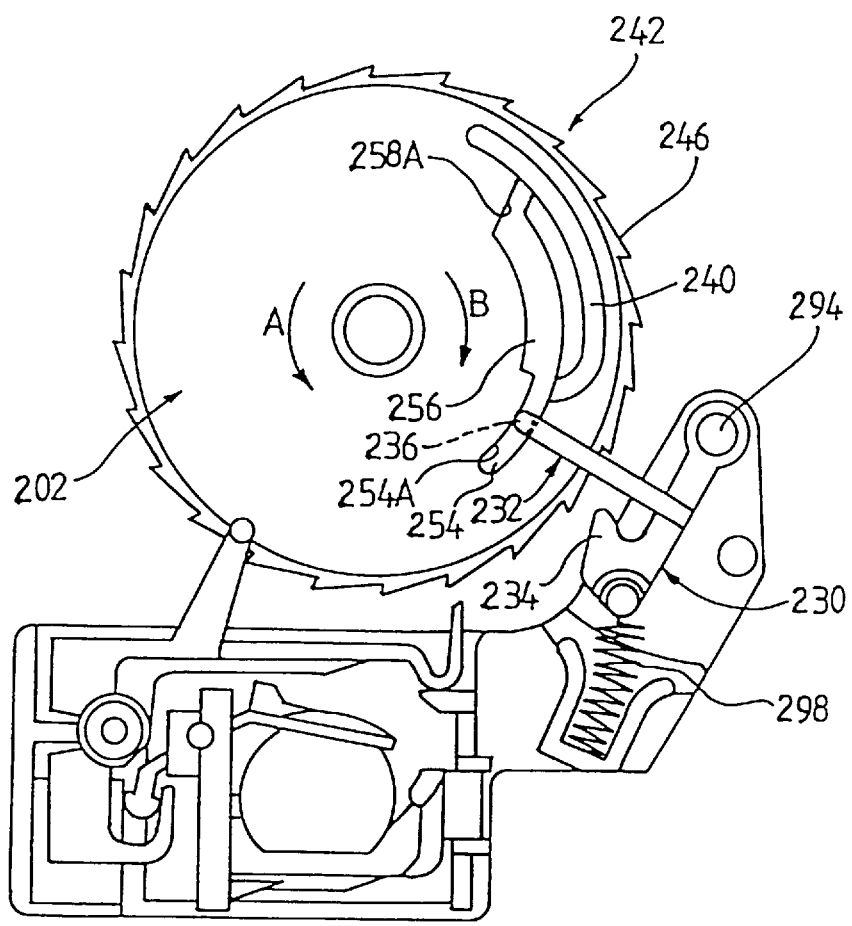
FIG. 27 is an enlarged view of the primary portion of the conventional retractor for seat belt for explaining the automatic locking mechanism.

Accordingly, as illustrated in FIGS. 25 and 26, the control mechanism of the second example of the present invention, which is provided between the control plate 165 and the locking lever 155, is composed as follows. The control mechanism includes: an outer circumferential wall 172, 173 for forming an outside cam surface 172a, 173a to hold the engaging portion 156 at the second position where the engaging portion 156 is not engaged with the ratchet wheel 18 when the engaging protrusion 159 of the locking lever 155 is located close to the outer circumference of the control plate; an inside cam groove 171 arranged inside the outer circumferential wall 173 for preventing the engaging portion 156 from being displaced from the first position where the engaging portion 156 is engaged with the ratchet wheel 18, to second position undesirably when the engaging protrusion 159 is located close to the inner circumference of the control plate; an introducing portion 168 capable of introducing the engaging protrusion 159 into the inside cam groove 171 when the webbing 50 is drawn out by an amount not less than the first predetermined amount which is a little smaller than all the amount of webbing to be drawn out; a guide portion 169 having a cam surface 170 for displacing the engaging protrusion 159 from the inside cam groove 171 to the outside cam surface 172a when the webbing 50 is wound by an amount not less than the second predetermined amount which is a little smaller than all the amount of webbing to be wound; a flexible engaging portion 160 of the locking lever 155; and an engaging protrusion 166 to be engaged with the flexible engaging portion 160.

By the retractor for seat belt according to the second example of the present invention, it is possible to accomplish a control mechanism corresponding to that described in the first example, and it is also possible to provide the same effects.

In this connection, it should be noted that the control mechanism, control plate, engaging member, locking means and locking operation means of the present invention are not limited to the above specific examples. Of course, various changes and modifications may be made in the invention without departing from the spirit and scope thereof.

We claim:

1. A retractor for a seat belt comprising:

a winding shaft around which a webbing is wound;

a locking means for locking the rotation of the winding shaft in a direction of drawing the webbing;

a locking operation means for locking the rotation of the winding shaft in the direction of drawing the webbing by operating the locking means in the case of emergency;

an engaging member having an engaging portion capable of being changed over between a first position at which the engaging portion is engaged with the locking operation means and a second position at which the engaging portion is not engaged with the locking operation means; and a controlling means for controlling the engaging portion to be located at the first position and the second position, wherein the controlling means includes a control plate rotated together with the winding shaft and also a control mechanism arranged between said control plate and said engaging member, wherein said control mechanism holds said engaging portion at said second position when said webbing is drawn out by an amount not less than a first predetermined amount, said control mechanism displaces said engaging portion from said second position to said first position when said webbing is wound by said first predetermined amount after said webbing has been thus drawn out by an amount not less than said first predetermined amount, and then said control mechanism displaces said engaging portion from said first position to said second position when said webbing is further wound by an amount not less than a second predetermined amount, said controlling means including:

an engaging protrusion arranged on one of said control plate and said engaging member; and a flexible engaging portion arranged on the other of said control plate and said engaging member, wherein said flexible engaging portion is capable of being deformed so that it can get over said engaging protrusion when said webbing is drawn out by an amount not less than said first predetermined amount, and said flexible engaging portion is engaged with said engaging protrusion when said webbing is wound by said first predetermined amount.

2. A retractor for a seat belt according to claim 1, said control mechanism including:

an outer circumferential wall for forming an outside cam surface to hold said engaging portion at said second position where said engaging portion is not engaged with said locking operation means when an engaging protrusion of said engaging member is located close to the outer circumference of the control plate;

an inside cam groove arranged inside the outer circumferential wall for preventing said engaging portion from being displaced from said first position where said engaging portion is engaged with said locking operation means, to said second position undesirably when said engaging protrusion of said engaging member is located close to the inner circumference of said control plate;

an introducing portion capable of introducing said engaging protrusion of said engaging member into said inside cam groove when said webbing is drawn out by an amount not less than said first predetermined amount; and a guide portion having a cam surface for displacing said engaging protrusion of said engaging member from the inside cam groove to said outside cam surface when said webbing is wound by an amount not less than said second predetermined amount after that.

3. A retractor for a seat belt according to claim 1, said engaging member including:

a cylindrical portion;

said engaging portion and an oscillating piece extending radially outward from said cylindrical portion;

another engaging protrusion and said flexible engaging portion protruding from an oscillating end of said oscillating piece so as to be engaged with said control plate; and a cam surface formed on said oscillating piece.

4. A retractor for a seat belt according to claim 1, wherein said engaging member has a cam surface, and further comprising a gear case having an outer wall integrally formed with a flexible piece, said flexible piece having an elastic protrusion that engages said cam surface, said engaging member being pushed by an elastic pushing force exerted on said cam surface by said elastic protrusion, in a direction so that said engaging portion can be located at the first position where said engaging portion is engaged with said locking operation means so as to prevent its rotation or located at the second position where said engaging portion is not engaged with said locking operation means.

5. A retractor for a seat belt according to claim 1, wherein said engaging member has a cam surface, and further comprising a gear case having an outer wall and a return spring arranged on said outer wall of said gear case, said return spring having an elastic protrusion that engages said cam surface, said engaging member being pushed by an elastic pushing force exerted on said cam surface by said elastic protrusion, in a direction so that said engaging portion can be located at the first position where said engaging portion is engaged with said locking operation means so as to prevent its rotation or located at the second position where said engaging portion is not engaged with said locking operation means.

6. A retractor for a seat belt comprising:

a winding shaft around which a webbing is wound;

a locking means for locking the rotation of the winding shaft in a direction of drawing the webbing;

a locking operation means for locking the rotation of the winding shaft in the direction of drawing the webbing by operating the locking means in the case of emergency;

an engaging member having an engaging portion capable of being changed over between a first position at which the engaging portion is engaged with the locking operation means and a second position at which the engaging portion is not engaged with the locking operation means; and a controlling means for controlling the engaging portion to be located at the first position and the second position, wherein the controlling means includes a control plate rotated together with the winding shaft and also a control mechanism arranged between said control plate and said engaging member, wherein said control mechanism holds said engaging portion at said second position when said webbing is drawn out by an amount not less than a first predetermined amount, said control mechanism displaces said engaging portion from said second position to said first position when said webbing is wound by said first predetermined amount after said webbing has been thus drawn out by an amount not less than said first predetermined amount, and then said control mechanism displaces said engaging portion from said first position to said second position when said webbing is further wound by an amount not less than a second predetermined amount, said control mechanism including:
- an outer circumferential wall for forming an outside cam surface to hold said engaging portion at said second position where said engaging portion is not engaged with said locking operation means when an engaging protrusion of said engaging member is located close to the outer circumference of the control plate;
- an inside cam groove arranged inside the outer circumferential wall for preventing said engaging portion from being displaced from said first position where said engaging portion is engaged with said locking operation means, to said second position undesirably when said engaging protrusion is located close to the inner circumference of said control plate;
- an introducing portion capable of introducing said engaging protrusion (59, 159) into said inside cam groove when said webbing is drawn out by an amount not less than said first predetermined amount;
- a guide portion having a cam surface for displacing said engaging protrusion from the inside cam groove to said outside cam surface when said webbing is wound by an amount not less than said second predetermined amount after that;

a flexible engaging portion of said engaging member; and another engaging protrusion to be engaged with said flexible engaging portion.

7. A retractor for a seat belt according to claim 6, said engaging member including:
- a cylindrical portion;
- said engaging portion and an oscillating piece extending radially outward from said cylindrical portion;
- said engaging protrusion and said flexible engaging portion protruding from an oscillating end of said oscillating piece so as to be engaged with said control plate; and
- a cam surface formed on said oscillating piece.

8. A retractor for a seat belt according to claims 6, wherein said engaging member has a cam surface, and further comprising a gear case having an outer wall integrally formed with a flexible piece, said flexible piece having an elastic protrusion that engages said cam surface, said engaging member being pushed by an elastic pushing force exerted on said cam surface by said elastic protrusion, in a direction so that said engaging portion can be located at the first position where said engaging portion is engaged with said locking operation means so as to prevent its rotation or located at the second position where said engaging portion is not engaged with said locking operation means.

9. A retractor for a seat belt according to claims 6, wherein said engaging member has a cam surface, and further comprising a gear case having an outer wall and a return spring arranged on said outer wall of said gear case, said return spring having an elastic protrusion that engages said cam surface, said engaging member being pushed by an elastic pushing force exerted on said cam surface by said elastic protrusion, in a direction so that said engaging portion can be located at the first position where said engaging portion is engaged with said locking operation means so as to prevent its rotation or located at the second position where said engaging portion is not engaged with said locking operation means.

* * * * *